US005504316A

United States Patent [19]
Bridgelall et al.

[11] Patent Number: 5,504,316
[45] Date of Patent: Apr. 2, 1996

[54] LASER SCANNING SYSTEM AND SCANNING METHOD FOR READING 1-D AND 2-D BARCODE SYMBOLS

[75] Inventors: Raj Bridgelall, Mount Sainai; Joseph Katz, Stony Brook; David P. Goren, Ronkonkomo; Paul Dvorkis, Stony Brook; Yajun Li, Oakdale, all of N.Y.

[73] Assignee: Symbol Technologies, Inc., Bohemia, N.Y.

[21] Appl. No.: 153,053

[22] Filed: Nov. 17, 1993

Related U.S. Application Data

[63] Continuation-in-part of Ser. No. 868,401, Apr. 14, 1992, Pat. No. 5,280,165, Ser. No. 37,143, Mar. 25, 1993, abandoned, Ser. No. 715,267, Jun. 14, 1991, Pat. No. 5,235,167, Ser. No. 981,448, Nov. 25, 1992, and Ser. No. 28,107, Mar. 8, 1993, Pat. No. 5,408,081, said Ser. No. 868,401, is a division of Ser. No. 520,464, May 8, 1990, Pat. No. 5,168,149.

[51] Int. Cl.⁶ .................................................... G06K 7/10
[52] U.S. Cl. .................... 235/462; 235/470; 235/472
[58] Field of Search ................................. 235/472, 462, 235/470, 471

[56] References Cited

U.S. PATENT DOCUMENTS

| | | | |
|---|---|---|---|
| 3,852,573 | 12/1974 | Dolch | 235/462 |
| 4,251,798 | 2/1981 | Swartz et al. | 235/462 |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,418,276 | 11/1983 | Yatsunami | 235/462 |
| 4,460,120 | 7/1984 | Shepard et al. | 235/472 |
| 4,496,831 | 1/1985 | Swartz | 235/472 |
| 4,766,297 | 8/1988 | McMillan | 235/455 |
| 4,794,239 | 12/1988 | Allais | 235/462 |
| 4,871,904 | 10/1989 | Metlitsky et al. | 235/467 |
| 4,933,538 | 6/1990 | Heiman | 235/462 |
| 4,973,829 | 11/1990 | Ishida | 235/462 |
| 5,115,121 | 5/1992 | Bianco et al. | 235/467 |
| 5,117,098 | 5/1992 | Swartz | 235/472 |
| 5,124,539 | 6/1992 | Krichever | 235/472 |
| 5,151,581 | 9/1992 | Krichever | 235/467 |
| 5,198,650 | 3/1993 | Wike, Jr. | 235/472 |
| 5,214,270 | 5/1993 | Rando | 235/472 |
| 5,221,832 | 6/1993 | Collins, Jr. et al. | 235/467 |
| 5,340,971 | 8/1994 | Rockstein | 235/472 |

*Primary Examiner*—Donald T. Hajec
*Assistant Examiner*—Karl D. Frech
*Attorney, Agent, or Firm*—Lowe, Price, LeBlanc & Becker

[57] ABSTRACT

Optical scanning of one- and two-dimensional barcode symbols is carried out first in an aim mode wherein the symbol is scanned using a first scan pattern that is relatively small and dense so as to be visible to the user and thereafter using a second, larger and more robust scan pattern for decoding. During aiming, the symbol is partially decoded to determine type and orientation, and this information is applied to control the angle of the scan pattern produced, the rate at which the scan pattern is increased for optimum decoding, and the ultimate pattern size. Preferred scan patterns, as well as unique scan mechanisms, are described.

109 Claims, 15 Drawing Sheets

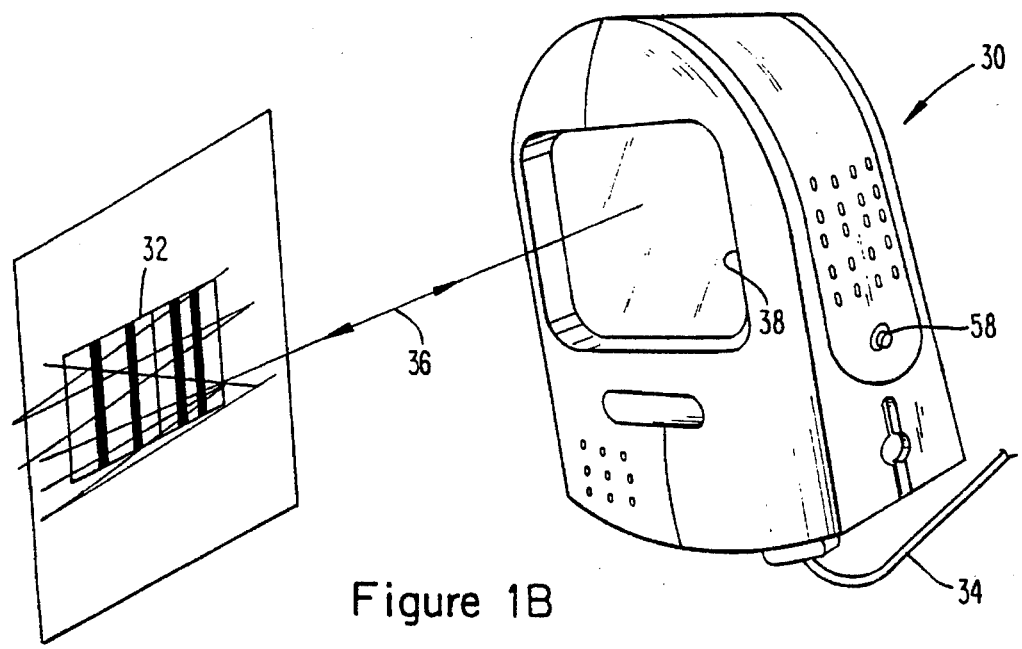
Figure 1B
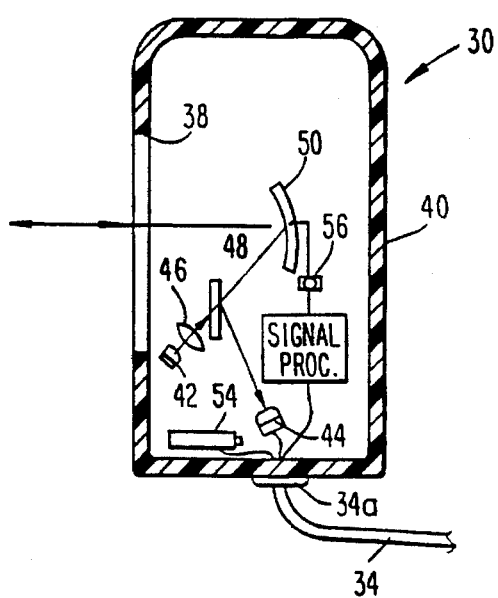
Figure 1C
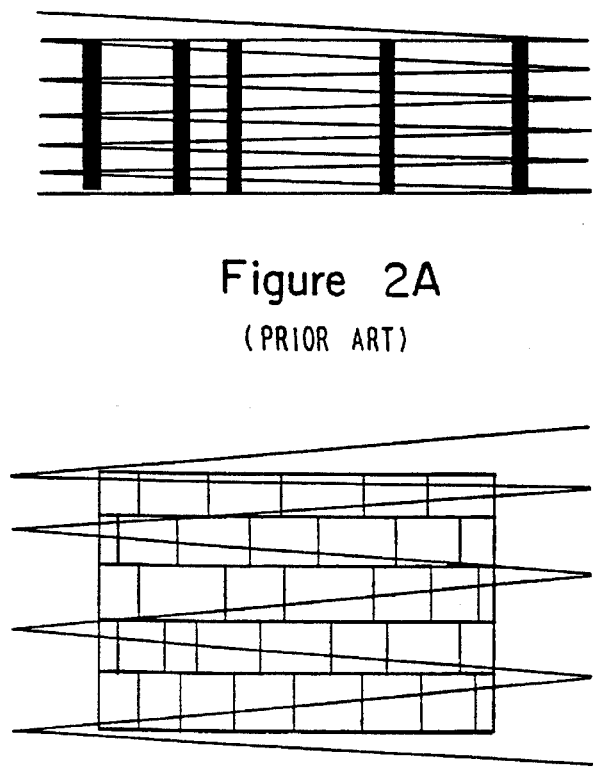
Figure 2A
(PRIOR ART)
Figure 2B
(PRIOR ART)

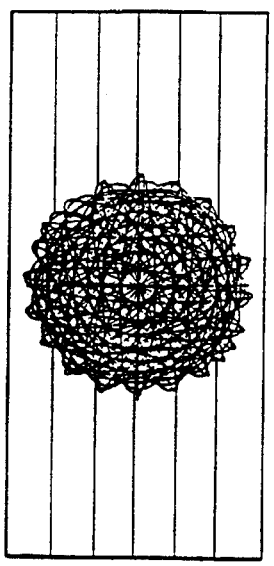
ROTATING LISSAJOUS
Figure 4A
RASTER
Figure 4B
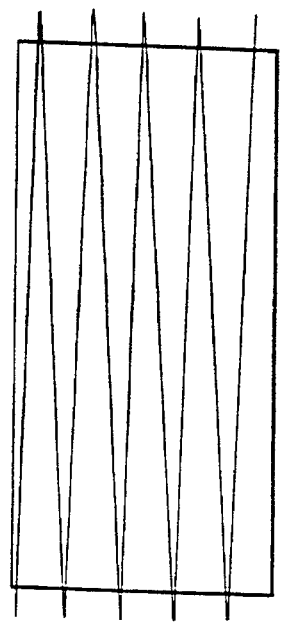
ENLARGED RASTER
Figure 4C
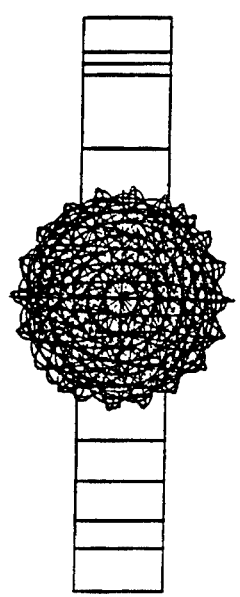
Figure 3A
Figure 3B

LASER SCANNING SYSTEM AND SCANNING METHOD FOR READING 1-D AND 2-D BARCODE SYMBOLS

REFERENCE TO RELATED APPLICATIONS

This application is a Continuation-in-Part of U.S. patent application Ser. No. 07/868,401, filed Apr. 14, 1992, now U.S. Pat. No. 5,280,165, which in turn is a division of application Ser. No. 07/520,464, filed May 8, 1990, now U.S. Pat. No. 5,168,149.

This application is also a Continuation-in-Part of U.S. patent application Ser. No. 08/037,143, filed Mar. 25, 1993, now abandoned Ser. No. 07/715,267, filed Jun. 14, 1991, now U.S. Pat. No. 5,235,167.

This application is also a Continuation-in-Part of Ser. No. 07/981,448, filed Nov. 25, 1992.

This application is further a Continuation-in-Part of Ser. No. 08/028,107, filed Mar. 8, 1993, now U.S. Pat. No. 5,408,081.

TECHNICAL FIELD

This invention relates generally to hand-held scanning systems which "read" indicia, such as barcode symbols, and in particular to systems and methods for scanning one-dimensional (1-D) and two-dimensional (2-D) barcode symbols with a first scan pattern that is relatively small and dense so as to be visible to the user, and thereafter a second, larger and more robust scan pattern for decoding. The invention also relates to scanners operable in both portable (hand-held) and surface mounted (hands-free) modes for reading various types of indicia. The invention further relates to novel miniature assemblies capable of 1-D and 2-D scanning.

BACKGROUND ART

Various optical readers and scanning systems have been developed for reading barcode symbols appearing on a label or the surface of an article. The barcode symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alpha-numerical characters intended to be descriptive of the article or some characteristic of it. Such characters typically are represented in digital form, and utilized as an input to a data processing system for applications in point-of-sale processing, inventory control and the like. Scanning systems of this general type have been disclosed, for example, in U.S. Pat. Nos. 4,251,798; 4,360,798; 4,369,361; 4,387,297; 4,409,470 and 4,460,120, all assigned to the assignee of the present invention.

One embodiment of such a scanning system, as disclosed in some of the above patents, resides in, inter alia, a hand-held, portable laser scanning head supported by a user. The scanning head is configured to enable the user to aim the head at a target to emit a light beam toward a symbol to be read. The light source is a laser scanner typically in the form of a gas or semiconductor laser element. Use of semiconductor devices as the light source in scanning systems is particularly desirable because of the small size, low cost and low power requirements of semiconductor lasers. The laser beam is optically modified, typically by a lens, to form a beam spot of a certain size at the target distance. Preferably, the beam spot size at the target distance is approximately the same as the minimum width between regions of different light reflectivity, i.e., the bars and spaces of the symbol.

The barcode symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the barcode symbol is referred to as the density of the symbol. To encode a desired sequence of characters, a collection of element arrangements are concatenated together to form the complete barcode symbol, with each character of the message being represented by its own corresponding group of elements. In some symbologies a unique "start" and "stop" character is used to indicate where the barcode begins and ends. A number of different barcode symbologies exist. These symbologies include UPC/EAN, Code 39, Code 128, Codabar, and Interleaved 2 or 5.

In order to increase the amount of data that can be represented or stored on a given amount of surface area, several new barcode symbologies have recently been developed. One of these new code standards, Code 49, introduces a "two-dimensional" concept by stacking rows of characters vertically instead of extending the bars horizontally. That is, there are several rows of bar and space pattern, instead of only one row. The structure of Code 49 is described in U.S. Pat. No. 4,794,239, which is hereby incorporated by reference.

A one-dimensional single-line scan, as ordinarily provided by hand-held readers, functions by repetitively scanning the light beam in a line or series of lines across the symbol using a scanning component such as a mirror disposed in the light path. The scanning component may either sweep the beam spot across the symbol and trace a scan line across and past the symbol, or scan the field in view of the scanner, or do both.

Scanning systems also include a sensor or photodetector, usually of semiconductor type, which functions to detect light reflected from the symbol. The photo-detector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alpha-numeric characters so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

More sophisticated scanning, described in U.S. Pat. No. 5,235,167, assigned to the common assignee, and incorporated herein by reference, carries out selective scanning of 1-D and 2-D barcodes. Preliminary information, such as the barcode type and size, is preliminarily decoded during an aiming mode of operation when a relatively narrow and visible raster pattern is impinged on the target. Based upon the preliminary information, received by the scanner in the form of light reflected from the target, converted to an electrical signal and decoded, an appropriately sized raster scan pattern is generated. If the barcode pattern is found to be skewed or misaligned with respect to the direction of the raster scanning pattern, the pattern is generated with an orientation in alignment with the barcode.

Aligning the scan pattern to the barcode is awkward, especially for long range scanning. If a barcode is not horizontally positioned on, for example, a container, the user is forced to position the scanner sideways in order to scan the barcode. One possible solution, described in the aforementioned U.S. Pat. No. 5,235,167, is to control the scanner to self-orient the scan pattern to the orientation of the barcode.

Scanning 2-D, or PDF, barcodes with a raster pattern also presents a similar problem. At certain distances, the visibility of a 2-D raster pattern is poorer than that of a single line, and orienting the barcode with the scan lines is not effortless. Assuming the pattern to be amply visible, the user may tend to position the 2-D barcode horizontally under a scan lamp. However, it would be ideal if no aligning is required. For example, a 2-D barcode may have been a photocopy vertically aligned onto a page. Upon scanning, the user may first subconsciously attempt to present the page horizontally, and thus present the barcode vertically. Without ability by the scanner to instantaneously sense barcode orientation, and then position a raster pattern to scan it, the user will be forced to realign the page vertically.

Following alignment of the scan pattern to the barcode, the pattern is then increased in width so as to fully span the length of the barcode, and if the pattern is determined to be a 2-D barcode, the height of the scan pattern is also increased so as to decode all of the barcode rows. However, the rate at which the raster pattern is increased in size is fixed and independent of the size of the barcode or the distance between the hand-held scanner and target. At a common rate of pattern size increase, depending upon the size of the barcode it may require from 0.1 to 2.0 seconds to open the scan pattern and decode the barcode. Distance to the target is another factor. Pattern size is incremented until the entire pattern is decoded. The size of each increment of increase is determined in part by the working range of the scanner. Very long range scanners, usable up to sixty feet, for example, may require smaller increments so that the patterns do not grow too fast at the end of a working range where much of the information, including start and stop codes, concerning attributes of the barcode resides. Hence, it would be desirable to control the rate at which the scan pattern grows to decode the barcode depending upon the characteristics of the barcode itself.

The scanner unit must be compact, energy efficient, and capable of scanning both 1-D and 2-D barcodes. The unit preferably will also be convertible between hand and surface support applications. The scan pattern will preferably be optimized in accordance with whether the unit is in hand held or surface supported modes of operation, whether it is in a presentation type of operation (wherein the indicia are passed under a scan lamp) or a pass through type of operation (supermarket type) and on the type of barcode or other indicia to be read.

DISCLOSURE OF THE INVENTION

A general object of this invention is to improve aim and shoot capabilities of hand-held barcode scanners. A more particular object is to improve the scan pattern visibility of hand-held barcode scanners during aiming. Another object of the invention is to implement robust scan patterns during decoding, and another is to enable the scanner to automatically orient the scan pattern to the rotational orientation of the symbol. A further object is to transition between aiming and decoding automatically while reading 1-D or 2-D barcodes. Other objects of this invention include miniaturizing the scan mechanism so as to enable the scanner to be conveniently hand-held, and compactly housing the scanner, and providing convertibility between hand-held and surface mount applications while automatically generating scan patterns optimized for the particular application and type of indicia being read.

These and other objects and features of the invention are satisfied, at least in part, by a scanning system operable both in portable and fixed modes for reading barcode symbols comprising means for determining whether operation is in a fixed or portable mode, and means for adapting the scan pattern to an optimized pattern for such mode of operation. Preferably, the scan pattern is also optimized in dependency on the type of indicia being read and whether scanning is carried out in a presentation type (under a scan lamp) or a pass through (supermarket) type reader.

In accordance with a preferred embodiment, a light beam scanner generates a light beam directed toward a symbol to be read and moves the beam along the symbol in an omnidirectional scanning pattern, that is, one wherein the pattern trajectory is not limited to one or a limited number of directions while a symbol is traversed. A light detector receives reflected light from the symbol and generates electrical signals responsive to the reflected light, and the scanning pattern is controlled in response to the electric signals. The scanning pattern may be radially symmetric, a rotating line pattern, or a spiral pattern. The pattern control may vary the diameter or trajectory of the light beam, and more particularly may move the light beam selectively along a first scan path or a second scan path depending on the electrical signals. In preferred embodiments, the first and second scan paths differ from each other by rotation about an axis of rotation, by an increase in scan path envelope diameter, by rotation of the first scan path about an axis of rotation and increase of scan path envelope diameter, or by displacement of the center of rotation of the first scan pattern. Preferably, the scan pattern is such that the bar code is traversed by at least two scan lines per row of bar patterns during reading.

A particular embodiment of the foregoing includes providing a relatively bright, rosette scanning pattern for enabling a user to aim and direct the beam toward a bar code symbol to be read, scanning the symbol, detecting light reflected from the symbol and generating an electrical signal in response to the reflected light, and modifying the radial diameter of the scan pattern in response to the electrical signal.

Another aspect of the invention provides a light source for generating a light beam directed toward a symbol to be read, and a light detector for receiving light reflected from the symbol and, in response, generating an electrical signal. This signal is converted to data corresponding to a content of the symbol. The light beam is controlled to scan the symbol with a prescribed scan pattern to develop first data, and thereafter increase a dimension of the scan pattern at a rate dependent upon that first data.

Preferably, the scan pattern is increased in dimension at a rate, and to a magnitude, that are determined by the decoded signal, to produce ultimate data corresponding to the symbol.

In accordance with a preferred embodiment, the light beam is controlled to scan a symbol in an aim mode of operation and thereafter in a decode mode. The decode mode may follow the aim mode in response to a second manual operation of a trigger, or may occur automatically. In the aim mode, the light beam scans the symbol with a first, relatively small prescribed scan pattern that is visible to the user and covers only a portion of the symbol. The decode mode of operation scans a portion of the symbol with a second (same or different) prescribed scan pattern, and then incrementally increases the size of this second pattern while decoding. Scan patterns found useful for aiming and decoding are spiral, stationary or rotating Lissajous, rotating line and rosette, with the spiral producing the most visible aim pattern and the rotating Lissajous producing the most robust decoding. A stationary or precessing raster pattern is produced for 2-D barcode scanning and decoding.

Although the scan patterns for aiming and decoding may be the same, they preferably are different. In this respect, the symbol is preliminarily analyzed using a rotating Lissajous pattern during the aim mode of operation to determine whether the symbol is one-dimensional or two-dimensional, and, in accordance with another aspect of the invention, the light beam is automatically controlled to describe a stationary or precessing raster scan pattern for decoding if the symbol is two-dimensional. If the scanned symbol is determined to be a one-dimensional symbol, the pattern for aiming and decoding both preferably are a rotating Lissajous. A scan control circuit automatically transitions between the aiming and decoding patterns, such as from Lissajous to raster for 2-D scanning.

In accordance with a further aspect of the invention, the scanner is incorporated within a housing including an approximately square window for enabling the light beam to pass through it. The housing is adapted to be hand-held, and releasably attached to a surface mount base. In a preferred embodiment, the surface mount base enables the housing to rotate about vertical and horizontal axes, and optionally includes a vertical extension to increase the height of the scanner.

Yet another aspect of this invention concerns decoding a barcode that is angularly offset from the horizontal, without prior knowledge by the user, and despite any droop in the scan lines emitted the scanner that is characteristic of some 2-D scanning mechanisms. Advantageously, the light beam is controlled to traverse the symbol with a scan pattern having the form of a raster that precesses among successive frames so as to align with rows of barcode oriented at various angles.

A further aspect of the invention provides system for reading coded indicia, comprising an electro-optical reader within a portable housing having a means for enabling a human operator to hold and aim the reader at indicia to be read. The reader includes a light source for generating a light beam, a light detector for receiving light reflected from the indicia and responsively generating an electrical signal, and means for converting the electrical signal to data representing information content of the indicia. A stationary fixture has a means for supporting the portable housing of the reader when not held by the operator. A scan control means controls the light beam to scan the indicia with different prescribed scan patterns in response to the information content of the indicia and whether the portable housing is separated from or mounted in the fixture.

When the reader is enabled, the scan means controls the light beam to preliminary scan the indicia with a scan pattern, such as a rotating Lissajous, that indexes angularly so as to traverse the indicia along different directions progressively as a function of time. Assume first that the housing is separated from the fixture. When the indicia content corresponds to a 1-D barcode pattern, as determined during preliminary scanning the scan pattern for decoding continues as a rotating Lissajous pattern, in accordance with the preferred embodiment. When the indicia content corresponds to a 2-D barcode pattern, the scan pattern preferably changes to a precessing raster pattern.

If the housing is mounted in the fixture, and the indicia content corresponds to a 1-D barcode pattern, as determine during preliminary scanning the scan pattern for decoding may be a single line or multiple line scan pattern. If the indicia content corresponds to a 2-D barcode pattern, the scan pattern may be a raster pattern. In either case, the scan pattern for decoding is optimized to read the classification of barcode preliminary scanned.

A particularly advantageous "aim and shoot" operation of the scanner, in accordance with the invention, is as follows. The operation comprises first directing a light beam toward a symbol to be read, executing an aim mode of operation by controlling the light beam to scan the symbol with a visible scan pattern in the form of a rotating Lissajous pattern, and then receiving light reflected from the symbol and producing first data identifying an attribute of the symbol including whether the symbol represents a one-dimensional or two-dimensional barcode symbol. The operation then provides executing a decode mode such that (a) if during aiming, the symbol is determined to be a one-dimensional barcode symbol, decoding while scanning using a rotating Lissajous scan pattern to scan the symbol, and (b) if the symbol is determined to be a two-dimensional barcode symbol, decoding while using a raster scan pattern to scan the symbol.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1B is a perspective view of a "palm-held" scanner, in accordance with one aspect of the invention; and FIG. 1C is a side view of the scanner in cross-section.

FIG. 2A shows raster scanning of a 1-D barcode pattern; and FIG. 2B shows scanning of a 2-D, or PDF, barcode pattern.

FIG. 3A shows a relatively small pattern in scanning a portion of a 1-D barcode for aiming; and FIG. 3B depicts expansion of the scan pattern to decode the entire barcode.

FIG. 4A shows a 2-D barcode, scanned by a relatively small, rotating Lissajous pattern for aiming; in FIG. 4B, the pattern has transitioned to a raster pattern suitable for 2-D barcode decoding; and in FIG. 4C, the raster is enlarged to decode the complete barcode.

BEST MODE FOR CARRYING OUT THE INVENTION

As used in this specification, the terms "symbol" and "barcode" are intended to be broadly construed and to cover not only patterns composed of alternating bars and spaces of various widths, but also other one or two dimensional graphic patterns, as well as alphanumeric characters.

The invention provides a scanner system in which the scan pattern produced by a light beam is controlled to describe an omnidirectional scanning pattern, light reflected from a symbol is detected, and the scan pattern is thereafter controlled in response to the detected signals. The invention also provides a scanner system and method in which adjustment of the spatial coverage of the scan pattern of a scanning beam is automatically made at a responsively controlled rate to effect an appropriate type of scanning pattern depending upon the type of symbols to be read. The invention further provides a scanning system operation in which two different types of barcodes may be read, a standard linear barcode and a 2-D barcode. The invention provides a technique for determining the type of barcode, its angular orientation, and adjusts the spatial coverage or vertical sweep of the raster scanning beam to fully scan and read a 2-D barcode.

In accordance with a first aspect of the invention, the invention further produces scan patterns for reading indicia, optimized in dependence upon the operating mode of the scanner (portable or fixed) and other criteria. A portion of the barcode is initially scanned by projecting a light beam on the target containing the barcode, and scanning the beam using a pattern that is relatively small and dense so as to be visible to the user for aiming. A portion of the barcode is partially decoded to determine the type, and possible size, of the barcode, whether it is a 1-D or 2-D barcode and its angular orientation. A rotating Lissajous pattern is preferred for this purpose as it has been determined to be most robust, although other patterns can be used. If the symbol is found to be a 1-D barcode, the scan pattern is increased in size (opened) to a maximum size, at a prescribed rate, in conformance with the portion of the symbol previously decoded, and the rotating Lissajous pattern decodes the entire symbol. If the symbol is determined to be a 2-D barcode, the rotating Lissajous pattern is converted to a raster pattern, and increased in size at a prescribed rate to decode the barcode. In a preferred embodiment, the raster pattern precesses so as to align with the 2-D symbol and therefore read 2-D barcodes of different angular orientations with respect to the horizontal scanning pattern.

Figure 1A:
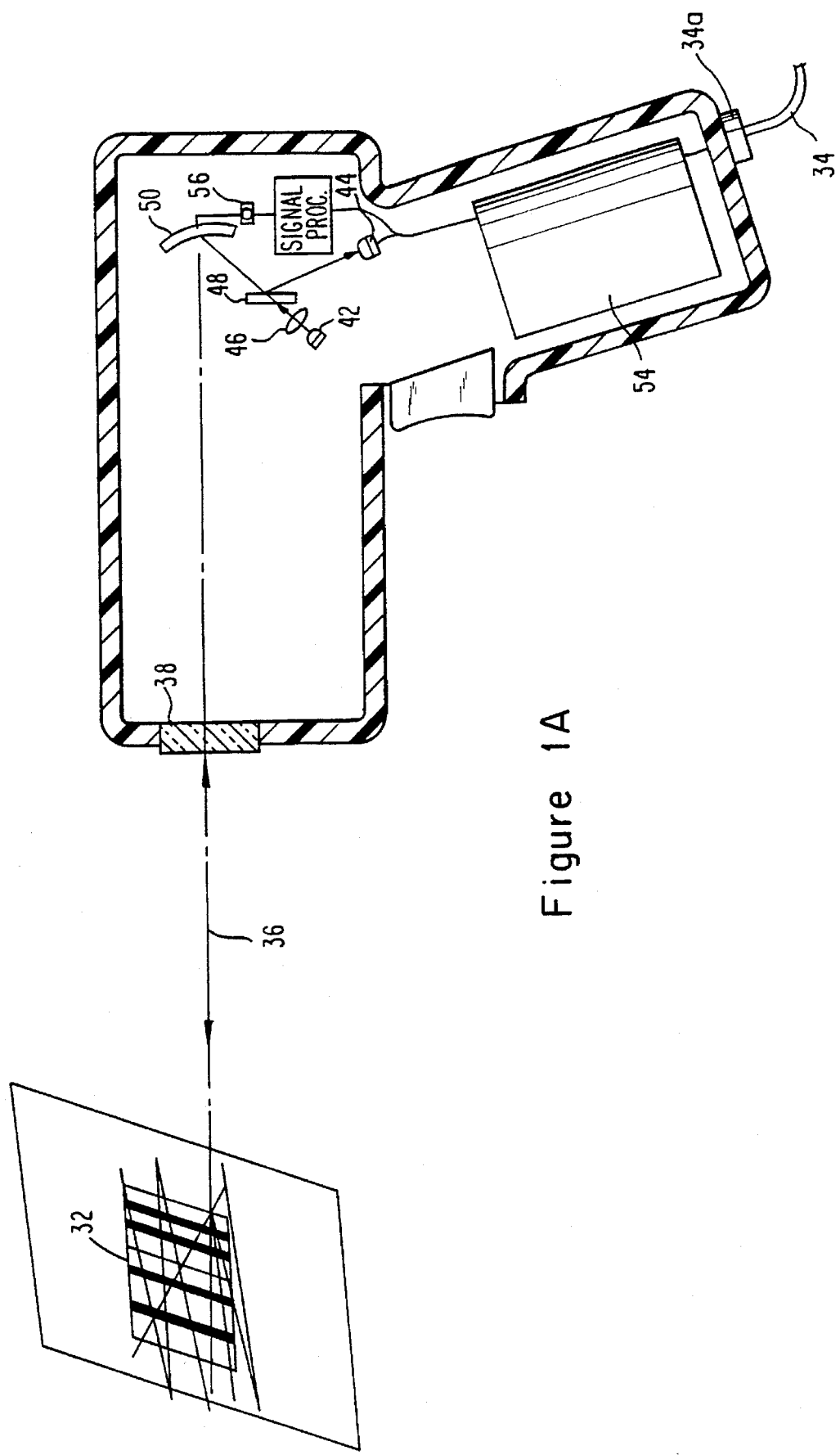
FIG. 1A is a side view of a "gun-shaped" scanner, in accordance with one aspect of the invention.

Thus, referring to FIG. 1B, a hand-held barcode scanner 30 is confined to be held in the palm of a user's hand and oriented in the direction of a barcode or other symbol 32 to be read. The scanner 30 is housed in a light-weight plastic housing 40 (FIG. 1C) containing a semiconductor laser light source 42, photodetector 44, optics 46, 48 and 50 and signal processing/control circuitry 52. Alternatively, as shown in FIG. 2A, the housing may be gun-shaped and provided with handle to enable the user to easily manually aim and shoot the light beam toward a symbol which may be remote from the housing, and an indicator which may be an audio source inside the housing to inform the user that the housing is positioned in the correct working range for reading bar code symbols. Such a housing is shown in FIG. 1 of U.S. Pat. No. 5,168,149, incorporated herein by reference. The circuitry in housing 40 may be powered by connection to a power source, or by batteries 54 to allow the unit to operate in a portable, wireless mode.

As further depicted in FIGS. 1B and 1C, a suitable lens 38, or multiple lens system, will focus the scanned beam onto the barcode symbol at an appropriate reference frame. The light source 42 is positioned to introduce a light beam into the axis of the lens 38, and the beam passes through a partially silvered mirror 48 and other lenses or beam-shaping structure as needed. An oscillating mirror 50 is connected to a scanning motor 56 that is driven by the control circuitry 52 in response to manual operation of a trigger 58 on the outside of the housing 40 (FIG. 1B). Signals to and from the control and signal processing circuitry 52 are carried by exit port 34a and line 34 to external equipment.

The scanner 30 may be adapted to scan different types of articles or for different applications by interchanging the scanning head with another through use of electrical connectors. Furthermore, the scanning module may be implemented within a self-contained data acquisition system including one or more such components as keyboard, display, printer, data storage, application software and data bases (see, for example, U.S. Pat. No. 4,409,470), and may also include a radio or other type of communications interface for communication with a local area network, telephone exchange network or radio broadcast system.

Figures 20A, 20B:
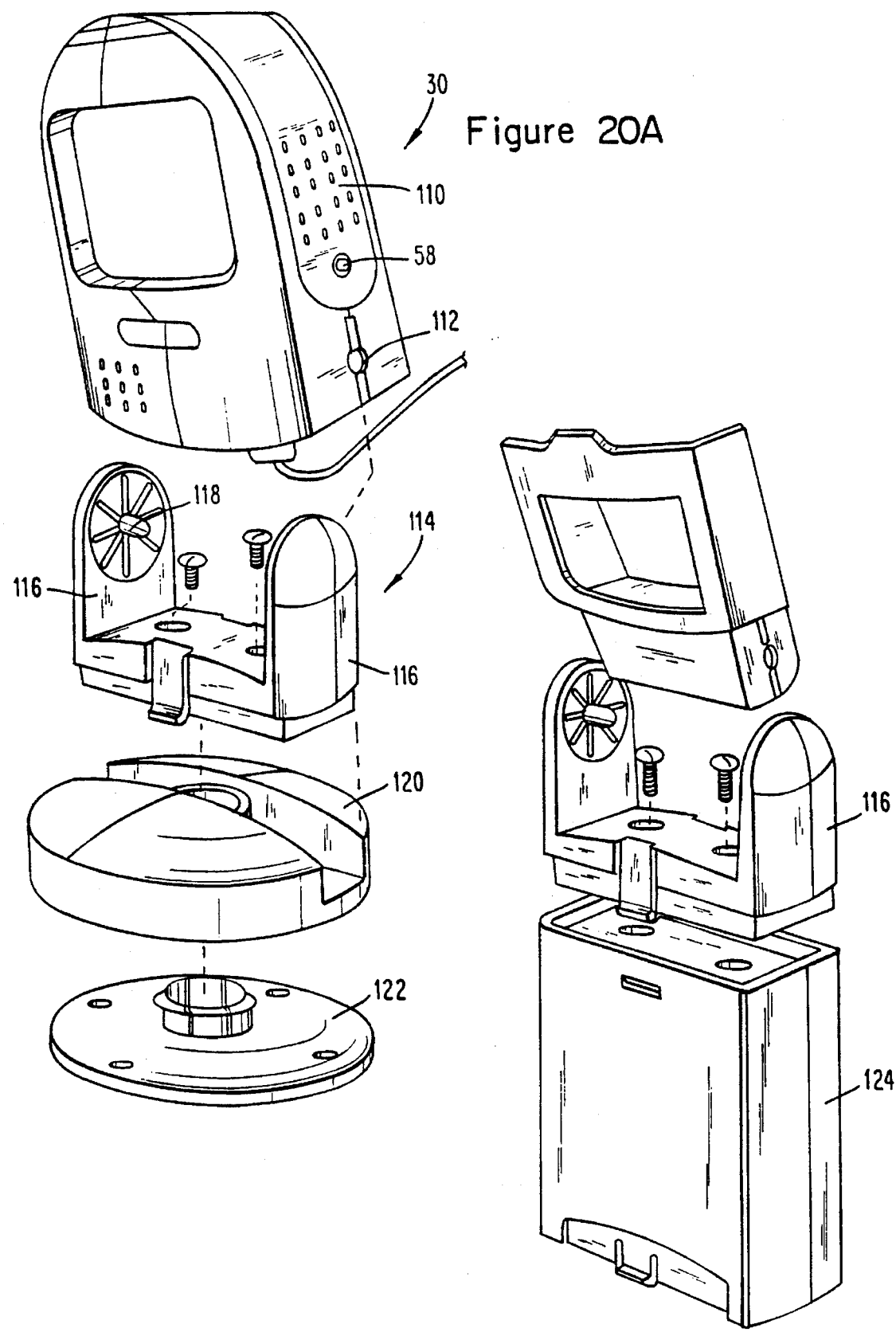
FIGS. 20A and 20B are exploded views of two embodiments of palm-held scanner housings, together with a surface mount fixture, in accordance with the invention.

Referring to FIG. 20A, the palm scanner module 30, now shown in more detail, incorporates a rubber grip 110 around the crown of the module slightly above a pair of indentations 112 for seating the module in a mounting bracket 114, enabling the module to pivot about a horizontal axis. The bracket 114 includes a pair of upstanding supports 116 having spindles 118 for rotatably supporting the module. The bracket 114 in turn is mounted on a base 120 that is turreted to a mounting plate 122 and hence is able to rotate about a vertical axis. The scanner module 30 can be easily removed from the bracket by lifting with a force sufficient to enable the spindles 118 to slip from the indentations 112.

The outgoing beam 36 is generated in the scanner 30 by a laser diode or the like, and directed to impinge upon the barcode symbol 32 that ordinarily is positioned a few inches from the front of the scanner. However, other applications may require scanning a target that is at a considerable distance, e.g., 60 feet from the scanner. The outgoing beam 36 is scanned using various patterns to be described later, one being a linear raster as shown in FIGS. 2A and 2B. The user positions the hand-held unit so that the scan pattern traverses the symbol to be read. Light reflected from the symbol is received by the unit 30 and detected by a photodetector 44 within the housing. Light beam 36, in both directions, passes through a transparent or translucent window 38 that preferably is approximately square in shape to accommodate 2-D as well as 1-D pattern scanning.

Referring to FIG. 2A in more detail, a raster scanning pattern, known in the art, is traversing a 1-D barcode. Such a scan pattern may be generated by vertical (or Y-direction) displacement of a linear scan line driven in the X-direction, such as described in U.S. Pat. No. 4,387,297. Although numerous scan lines traverse the barcode, only one line of scan is necessary for proper decoding since the additional scan lines are redundant and only re-read the same data on a different vertical position of the barcode symbol. In FIG. 2B, the raster traverses a 2-D barcode, and is opened vertically to encompass the barcode entirely. Although the 2-D pattern contains many rows of optical elements, it is necessary only that each row be traversed once, as shown, for decoding.

Figure 5A:
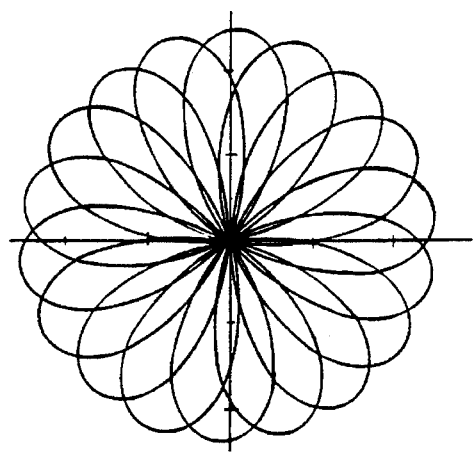
FIGS. 5A and 5B show rosette patterns of different density for aiming.
Figure 5B:
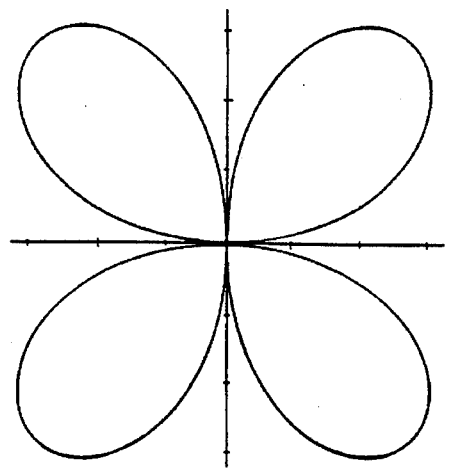
Figure 5C:
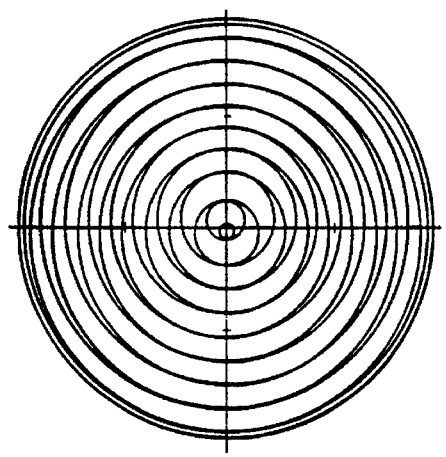
FIG. 5C shows a spiral pattern and FIG. 5D shows a stationary Lissajous pattern.
Figure 5D:
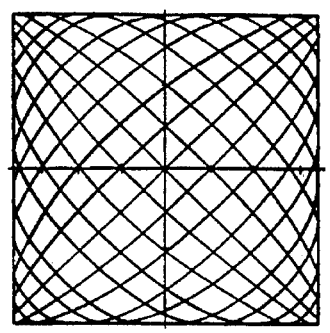

For long range scanning, first aiming and then scanning the barcode to read the code is natural. These operations are termed the "aim mode" and "decode mode" hereinafter. Two trigger pull positions are normally provided, or the trigger is pulled twice to produce these respective modes of operation. In accordance with one aspect of the invention, and referring to FIGS. 3A and 3B, upon a first pull of the trigger 58, a bright spot for aiming is used to establish a small visible pattern on the target surface. This technique is similar to that disclosed in U.S. Pat. No. 5,117,098 of Swartz and assigned to the assignee of this invention. This visible pattern may be produced by a small scan line, but preferably is presented in the form of a bright spot. This "spot" can be developed, and is presented in most visible form, by an oscillating circle, or spiral, pattern shown in FIG. 5C. Other patterns found suitable for aiming are rosette (FIGS. 5A and 5B), stationary Lissajous (FIG. 5D), rotating line (FIG. 5E) and rotating Lissajous (FIG. 6).

Figure 5E:
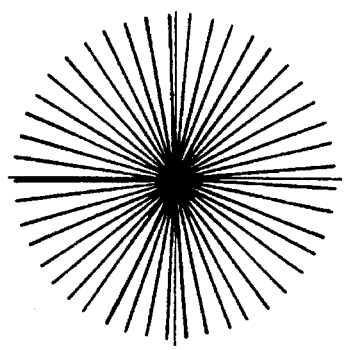
FIG. 5E shows a rotating line pattern for aiming with automatic scan alignment.
Figure 6:
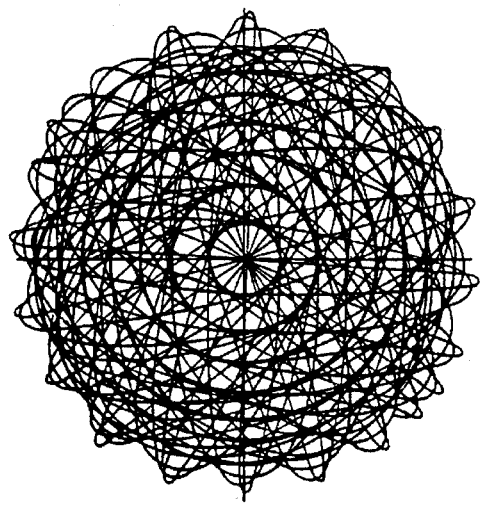
FIG. 6 shows a rotating Lissajous pattern for aiming on and decoding 1-D barcodes.

For example, the line scan pattern of FIG. 5E is produced by generating a beam of a relatively short line scan pattern, and rotating the pattern quickly about its center once or after every few scans. Alternatively, the scan line may be randomly positioned at pre-determined angles, once or after every few scans, and the angle of rotation about its center of rotation may be controlled in response to signals read produced by light reflected from the symbol. Assuming that the spot is located in nearly the center of the barcode, the orientation of the barcode may be estimated using a peak detector, to be described later, if the barcode is a 1-D barcode or the orientation may be estimated from the returned digital bar pattern, or DBP, as the scan line is positioned at different angles.

Upon the second trigger pull (or further pull of the trigger in the same stroke if the trigger is multi-purpose), or automatically, in the decode mode of operation, the scan pattern opens in the exact orientation of the barcode as determined by the peak detector, as shown in FIG. 3B, so that the entire barcode will be decoded. The ultimate size of the rotating scan line pattern, and the rate at which the pattern opens, is controlled dependent upon barcode attributes, such as type, aspect ratio and size, decoded during the aim mode. Optionally, the barcode may be completely decoded during the aim mode, and if so, a consistency check may be performed during the decoding mode.

The following example assumes an aim pattern in the form of a single scan line, FIG. 5E, a pattern particularly useful for discerning the orientation of a barcode prior to decoding. In order to rotate a single scan line, or position it at any given angle, an element having two degrees of freedom with equal resonant frequencies on both axes is necessary. The horizontal and vertical oscillations are given by $$\hat{X}(t) = \sin(wt)\cos(\theta)$$

$$\hat{Y}(t) = \sin(wt)\sin(\theta)$$

where $\theta$ is the angle of rotation with respect to the x-axis. This angle will normally be produced in the form of a digital quantity presented to the rotation system via a microprocessor system. The resonant frequency w should be chosen high enough so that a possible loss in aggressiveness during the angle estimation/aiming period is not apparent.

In order to cover all possible orientations of the barcode, the scan lines must be capable of rotating through 180 degrees, and preferably the entire symbol will be covered such that at least two scan lines traverse each row of bar patterns during reading. However, the resolution of rotation depends on the aspect ratio and size of the barcode.

If it is necessary to rotate the scan line once every s scans, at a resolution of r degrees, for a duration of d seconds in order to cover a total of 180 degrees, then $$w = \frac{180\pi s}{rd}$$

is selected.

For example, if a complete 180 degree rotation should be accomplished within 0.1 second, at 10 degree resolution for every scan, then $w/2\pi = 90$ Hz will suffice.

Figure 11:
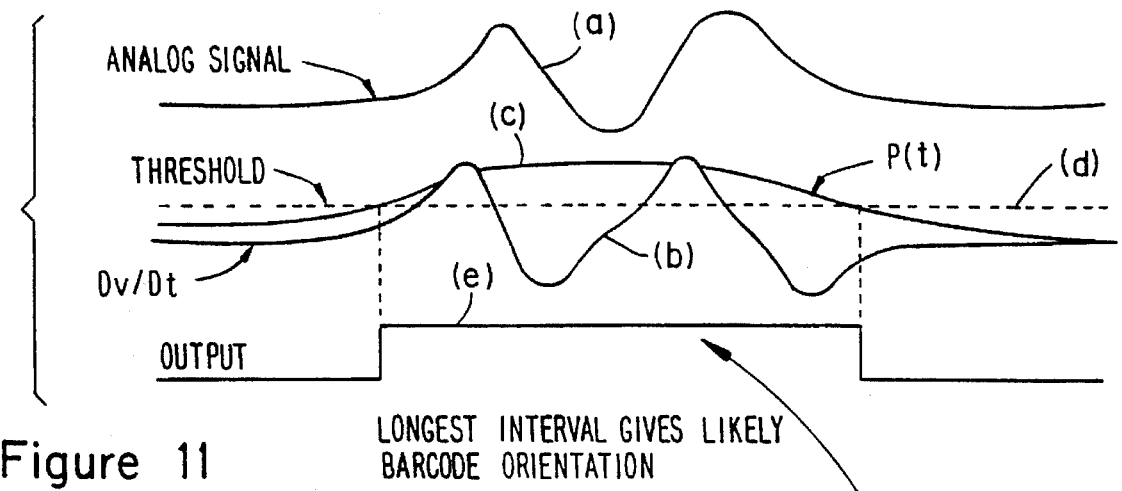
FIG. 11 describes methodology for automatic barcode alignment.
Figure 10A:
FIGS. 10A and 10B depict DBP data streams and signal intervals for two different barcode orientations.
Figure 10B:
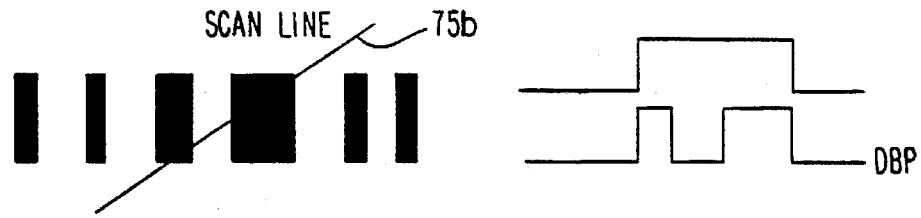
Figure 12:
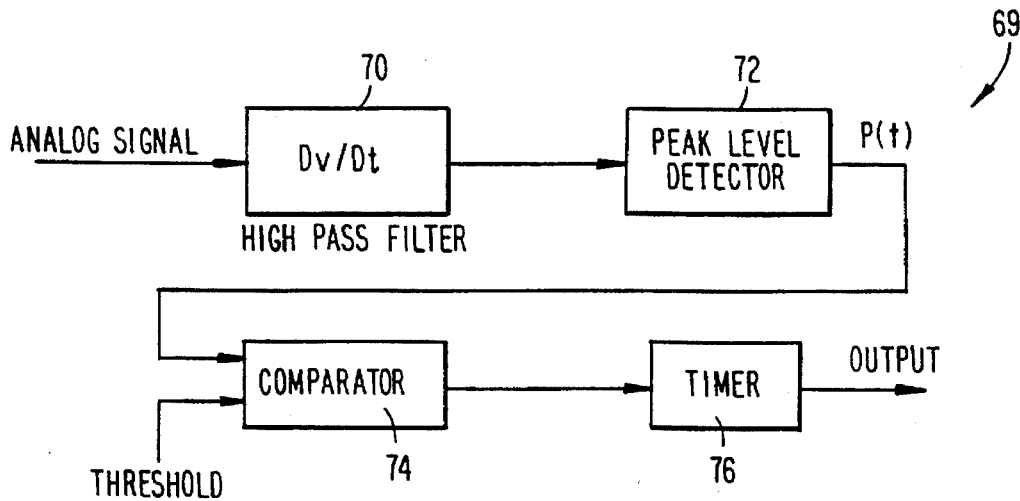
FIG. 12 is a simplified block diagram of a barcode alignment circuit used in the invention.

Referring to FIGS. 10–12, means for detecting when the scan line of FIG. 5E is aligned to a barcode are shown. In FIGS. 10A and 10B, the barcodes and scan line are in alignment and out of alignment, respectively. The DBP (digital bar pattern) stream corresponding to the scanned barcode is analyzed to find the scan angle at which the energy content of the DBP stream is maximum because the scan line has intersected the most barcode elements. In FIG. 10A, the DBP pattern scanned by line 75a has more elements than that of FIG. 10B where the barcode has been scanned by a skewed scan line 75b. As the scan line is rotated, the number of elements produced in the DBP stream is estimated by filtering and comparing with the stream produced by other scan line angles. Hence, referring to FIG. 11, the DBP stream is read and supplied as an analog signal (a) derived from the DBP stream to a high pass filter 70 which produces waveform (b). A peak level detector 72 tracks the peak value or envelope of the filtered replication of the DBP stream (see waveform (c)), and the peak value is compared to a prescribed threshold (e) by comparator 74. The points at which the envelope and threshold intersect each other develop an output signal (e) having a duration that corresponds to the number of DBP elements spanned by the scan line. The duration of the output signal is measured by timer 76, to indicate the number of elements of the DBP stream, and the scan line producing a DBP stream of greatest duration is identified as having the best alignment to the barcode.

The orientation of the scan line alternatively may be determined more precisely than what is capable using the circuit of FIG. 12 by implementing an algorithm wherein the DBP stream is read and scanned for regions bound by a known scan direction synchronizing signal (called "SOS") having the most elements. For example, the orientations between five and ten degrees may have one hundred elements, while all others have fewer. If the scan line is shorter than the barcode, then this region between five and ten degrees, for example, will indicate the general barcode orientation. A more exact orientation can be found by rotating the scan line in a direction that minimizes the total sum of these element widths. Once the exact orientation is found, the scan line length may be increased until a decode occurs. Hence, this approach represents a global search for general barcode orientation, and then a fine tuning step.

The circuit of FIG. 12 is more immune than the algorithmic approach, as the threshold of comparator 74 may be set to ignore spurious elements due to noise.

Although the short single line pattern is the most visible, it is disadvantageous for aiming because it suggests orientation and may be psychologically distracting. Larger spots, those shown in FIGS. 5A–D, can be simulated without changing the aperture by creating the spiral pattern shown in FIG. 5A, implemented by modulating the size of a circle pattern. As mentioned previously, a spiral is the most visible, non-orientation, suggestive and easily implemented. All of the aim patterns of FIGS. 5A–D can be created by the circuit shown symbolically in FIG. 8, which implements the following equations:

$$x(t) = \sin(w_2 t) A(t) \quad (1)$$

$$y(t) = \cos(w_1 t) A(t) \quad (2)$$

The function A(t) can be arbitrarily picked. For example, let $A(t) = \sin(w_3 t)$. The rosette pattern of FIG. 5A is created with $w_1 = w_2$, and $w_3 = 4w_2$; the rosette pattern of FIG. 5B is created with $w_1 = w_2$, and $w_3 = 2w_2$; the spiral pattern of FIG. 5C is created with $w_1 = w_2$, and $A(t) = |\sin(w_2/50)|$; and the stationary Lissajous pattern of FIG. 5D is created with $w_1 = w_2/1.1$, and $A(t) = 1$. The rotating line pattern, FIG. 5E, is created by having the modulating function $A(t) = \sin(w_{scan} t)$ and $w_1 t = w_2 t = \theta$ where $\theta$ is the angle of the scan line, and $w/2\pi$ is the scanning frequency.

Another pattern which may be used for aiming, and which will be described in more detail later, is the rotating Lissajous pattern shown in FIG. 6. The rotating Lissajous pattern is somewhat inferior for aiming because its visibility is less pronounced than other patterns, but is particularly advantageous insofar as its ability to decode during aiming is the most robust of all the patterns considered.

Another pattern for aiming found particularly effective is a bright rosette pattern of diameter less than the diameter of rosette to be used for decoding.

Once satisfied with aiming, the scanner begins to deflect the light beam with a scan pattern appropriate for decoding the barcode. The scan pattern for decode may be the same as for aim, or may be a different pattern or may be the same or different pattern with center of rotation that shifts upon transition between the two modes or during decoding. In a preferred embodiment, the decode scan pattern which is generated depends upon whether the barcode is found to be a 1-D barcode (when the preferred decode pattern is omnidirectional) or a 2-D barcode (when the preferred decode pattern is raster). Pattern switching may be responsive to a second trigger pull, or may occur automatically.

For example, referring to FIG. 4A, it is assumed that a rotating Lissajous aiming pattern is directed toward a target having a 2-D barcode, as shown. The barcode is partially decoded to determine barcode type and orientation. The first row of the barcode may be decoded to determine whether the barcode is a 1-D or 2-D barcode. Alternatively, an algorithm may be used that is capable of determining whether the portion read is a portion of a 1-D or 2-D barcode on the basis of code words detected and decoded.

Upon determining, in this example, that the barcode is a 2-D barcode, the scan pattern is changed to a raster pattern, as shown in FIG. 4B, necessary for scanning such barcodes. Based upon data read from the barcode during the aim mode, the width of the scanning pattern is opened until it at least spans the width of the barcode, and the height is incremented until the entire barcode is decoded. As the scanning pattern is increased in height, the barcode rows encompassed by the scanning pattern will be read, decoded and interpreted to determine whether an entire 2-D barcode symbol has been scanned, as described in U.S. Pat. No. 5,235,167. Each row the bar code will preferably be traversed by at least two scan lines, although only one traversal is necessary. Once the symbol is read, feedback to the user in the form of, for example, an audio tone, may be presented by the control/processing circuitry within the bar code reader.

Preferably, the specific pattern produced by the scanner, in accordance with an important aspect of the invention, is a pattern that is optimized for a particular classification of indicia and depending on whether the scanner is operating in a portable mode or is mounted in its fixture. A scan pattern is deemed to be optimized if it reads and decodes a prescribed pattern in a minimum amount of time, and within reasonable economic constraints.

If the scanner is operated in the fixed mode, with the palm held module 30 is mounted in bracket 114 and the module 30 directed to a region across which items bearing indicia, such as a barcode, to be read are passed, the rotational orientation of the scan pattern with respect to barcode is indeterminate. On the other hand, if the scanner is operated in the aim and shoot mode, with the module 30 separated from the bracket, the scanning pattern may be manually aligned with the barcode. The specific pattern produced should be optimized for decoding barcodes of the particular classification of barcode being read.

Figure 21:
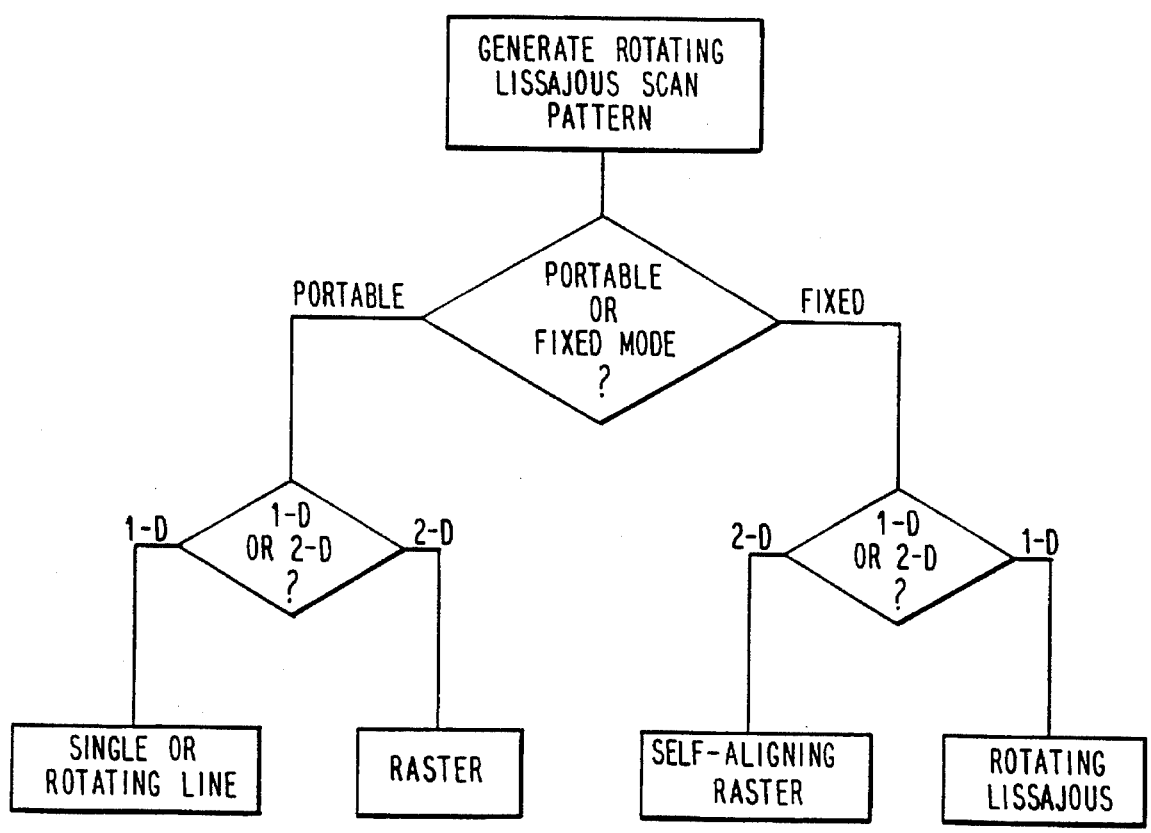
FIG. 21 is a chart for explaining the operation of the scanner in portable and fixed modes for 1-D and 2-D barcode patterns.

Hence, in accordance with an aspect of the invention, and referring to FIG. 21, a suitable scan pattern is produced for determining classification of the symbol to be read, e.g., whether the symbol is a 1-D or 2-D barcode. In the example shown, a rotating Lissajous scanning pattern is selected for its omnidirectionality and robust decoding ability. At the same time, it is determined whether the scanner is in the portable mode or fixed mode of operation (the order of sequence of the first two steps is arbitrary). This may be carried out by detecting the presence of the module 30 in bracket 114 by means of, e.g., a mechanical or magnetic proximity switch in the base of the fixture (not shown in FIGS. 20A, 20B; however, see U.S. application Ser. No. 08/028,107, filed Mar. 8, 1993, incorporated herein by reference), or by a manual switch located on module 30 or elsewhere.

Assume first that the scanner is in the fixed mode of operation and arranged to read a barcode symbol. The symbol is preliminarily read using the rotating Lissajous scan pattern to detect the start and stop codes of the barcode, so as to determine whether it is a 1-D or 2-D barcode. If the symbol being scanned is determined to be a 1-D barcode, the scanning pattern will remain defaulted in the form of a rotating Lissajous pattern, as shown in FIG. 21, a pattern that has been determined in accordance with the invention to be optimized for 1-D barcodes. If the symbol is determined to be a 2-D barcode, on the other hand, the scanning pattern is changed to a self-aligning raster, as also shown in FIG. 21. (A self-aligning raster is a raster that rotates or precesses so as to traverse a 2-D barcode and read it independently of the rotational orientation of the barcode. A specific embodiment of self-aligning raster is a precessing raster described in more detail later with reference to FIG. 7.)

Still referring to FIG. 21, when the scanner is determined to be operating in the portable mode, and the symbol as read during Lissajous scanning is determined to be a 2-D barcode, the scanner produces a raster type scanning pattern. This raster is preferably stationary, but may be enhanced to precess or rotate so as to read barcode symbols of diverse rotational orientations. On the other hand, if the symbol is determined to be a 1-D barcode symbol, scanning is continued in the form of a pattern optimized to read such barcodes, such as a single or rotating scan line, or rotating Lissajous.

The particular scanning patterns produced for decoding 1-D or 2-D barcodes when the scanner is operated in portable and fixed modes can be varied for specific applications and modules of particular optical characteristics. What is important is that the scanner is adaptive, controlled manually but preferably automatically, to produce decoding scan patterns that are optimized, that is, as robust as practical with respect to the operating mode selected and the classification of indicia being read.

Preferably, the scan pattern is also optimized in dependency on whether scanning is carried out by a presentation type (under a scan lamp) or a pass through (supermarket) type reader. In the presentation type reader, an article carrying a barcode or other symbol to be read is brought to the reader or the reader is brought to the article. Since reading is carried out in very close proximity to the barcode, there is no need for aiming. In the pass through reader, the article bearing a barcode is swiped past a scanning pattern produced by a fixed source of light beams. These two modalities present different decoding requirements to barcode readers (in the pass through mode of reading, the article swipes through the scan region relatively quickly, whereas in the presentation mode, the barcode is relatively stationary when read). Hence, if reading is carried out in the pass through mode, and the barcode is not very truncated (that is, the barcode is thin), a scanning pattern producing lines that are more sparsely spaced but more often repeated is preferred because it is more likely to traverse the barcode. That is, the faster the swipe, the thicker the barcode should be and hence a scanning pattern, such as a rotating Lissajous pattern, optimized for a relatively thick barcode pattern is preferred.

Assuming now that the rotating Lissajous pattern is generated (FIG. 4A) for aiming, in aim and shoot scanning. Another important aspect of the present invention is that the rate of increase of the size of the raster in moving from FIG. 4B to FIG. 4C is responsively controlled depending upon the size and nature of the barcode. The rate at which the scan pattern opens may be controlled to be faster for larger barcodes. The size of each increment may be dependent upon the working range of the scanner. For example, very long range scanners, e.g., up to about 60 feet, may require smaller increments so that the patterns do not grown too fast at the end of the working range.

The preferred Lissajous pattern for decoding, shown in FIG. 6, is preferably of frequency ratio x/y ranging from 1.1 and 1.3 and rotated at a rate of between 1 to 4 degrees per scan. These numbers are found optimal for scanning highly truncated 1-D barcodes. In this respect, the rotating Lissajous pattern, with its sequence of scanning patterns that are successively rationally offset, has been found more robust for decoding than a stationary Lissajous pattern. The optimal stationary Lissajous pattern is at a frequency ratio 0.7. However, the optimized rotating Lissajous pattern produces a 17% improvement in decoding efficiency over the stationary Lissajous pattern. When the rotating Lissajous pattern is converted to a raster for scanning 2-D barcodes in omnidirection, the frequency ratio is made higher by increasing the slower scan frequency y.

Figure 8:
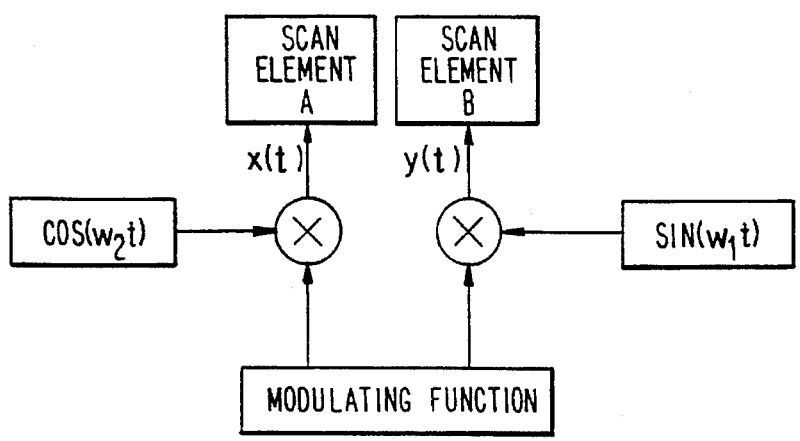
FIG. 8 is a simplified block diagram of circuitry for producing aim and rotating line scan patterns.
Figure 13A:
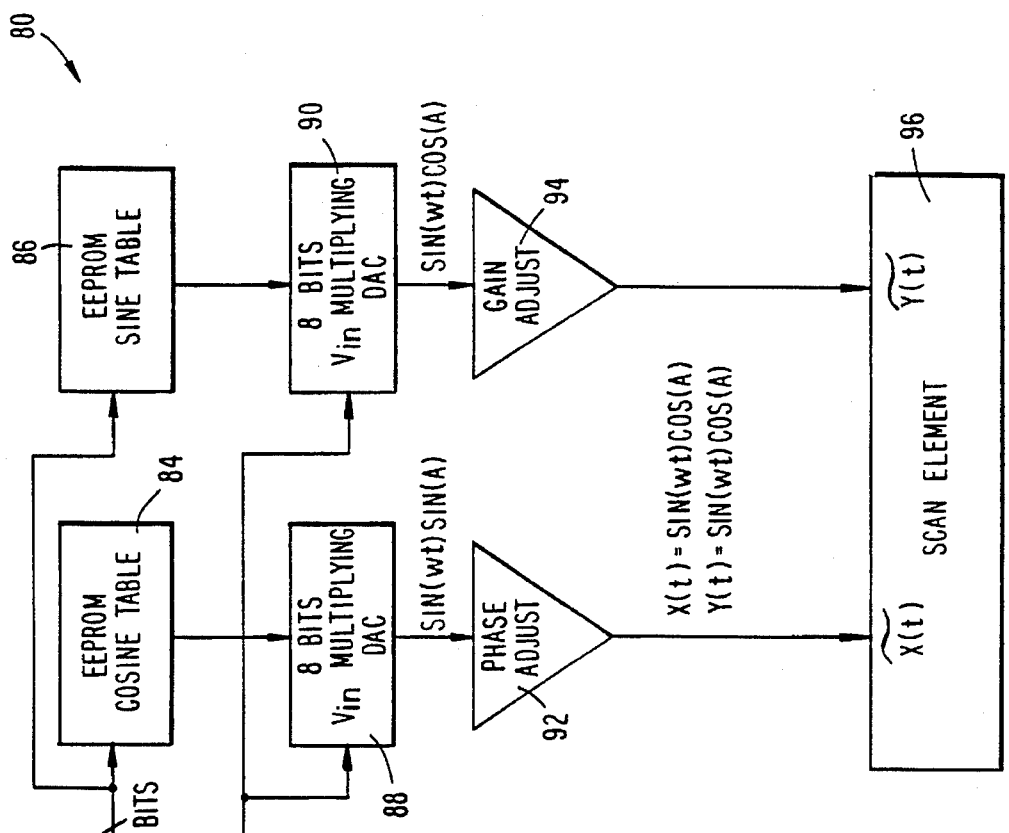
FIG. 13A is a block diagram of circuitry for driving scan elements for single line rotation and scanning.

Single line rotation and scanning is produced, in accordance with the invention, by driving two mirrors (not shown) using the circuit 80 of FIG. 13A which corresponds to, but is more detailed than, FIG. 8. The two mirrors are mounted on resonant scan elements having relative resonant frequencies at wa and wb, respectively, shown in FIG. 13B. To implement oscillation of the two mirrors for scanning in X- and Y-directions, satisfying the relationships given in equations (1) and (2), the circuit 80 implements a processor 82 that estimates the orientation of the barcode based on element counts in the DBP stream and/or start and stop character detection. A scan line will be opened upon the second trigger pull at an angle based on the last detected barcode orientation. The processor 82 addresses EEPROM cosine and sine tables 84 and 86 which generate digital data corresponding to amplitudes of the cosine and sine of the prescribed angles. These digital signals are multiplied by sin (wt), and the product converted to a corresponding analog signal in multiplying digital-to-analog converters (DAC) 88 and 90.

Figure 13B:
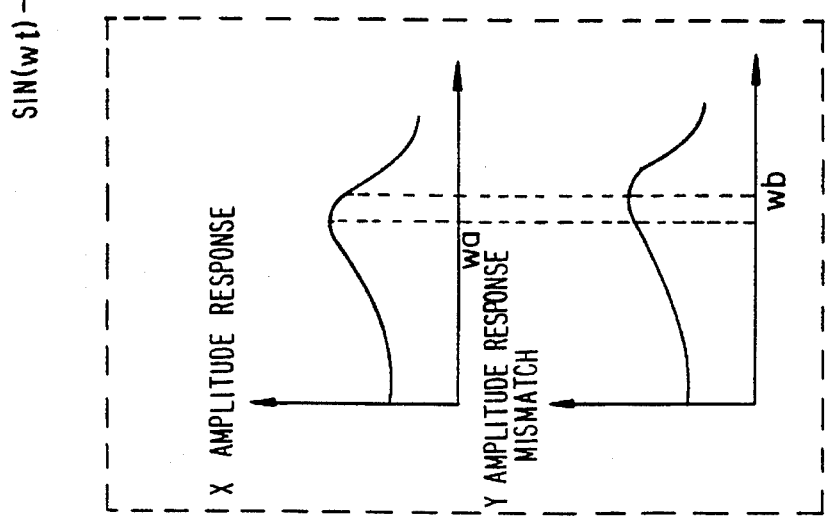
FIG. 13B shows amplitude responses of a typical resonant scan element.

Amplitude control shown herein assumes that the Y-element will be driven somewhat harder than the X-element so as to compensate for any slightly leading resonant peak, as depicted in the amplitude response curves of FIG. 13B. Similar compensation may have to be carried out to equalize the phase responses. Here, it is assumed that the X-element is leading in phase. The phase adjustment is performed by phase adjustment circuits 92 and 94. The outputs of the phase adjustments 92, 94 are supplied to the X- and Y-inputs of resonant scan elements 96.

Resonant scan elements are known in the art. Such elements typically are provided with a flexural strip of Mylar or other material cantilever mounted to a base and supporting a miniature permanent magnet positioned within a coil. The coil is secured to a base, and a scan mirror is attached to the free end of the cantilever mounted flexural strip. By changing the dimensions or flexural characteristics of the cantilever mounted strip, the mass of the strip, the permanent magnet and mirror, or the distribution of mass on the flexural strip, different resonant frequencies can be established. See, for example, copending application Ser. No. 07/884,738, filed May 15, 1992 and incorporated herein by reference.

The resonant scan element can also be presented as a single element having different resonant frequencies in mutually orthogonal directions, and utilizing a single mirror to perform single line rotation and scanning. The circuit 80 of FIG. 13A can be implemented to apply drive signals for X- and Y-scanning to the two inputs of the dual-resonance scanning element, as disclosed in the copending application.

To produce 2-D scanning patterns for symbologies such as PDF 417, described in U.S. patent application Ser. No. 07/461,881, filed Jan. 5, 1990, the resonant scan element must be capable of being simultaneously driven by at least two frequency components. Raster pattern rotation is achieved by driving a 2-D scanner such that the horizontal element is driven with the signal X(t) and the vertical element is driven with the signal Y(t), where $$X(t) = \sin(w_1 t) \cos(\theta) - \sin(w_2 t) \sin(\theta) \quad (3)$$

$$Y(t) = \sin(w_1 t) \sin(\theta) - \sin(w_2 t) \cos(\theta) \quad (4)$$

and θ is the angle of rotation in digital form.

Figure 16:
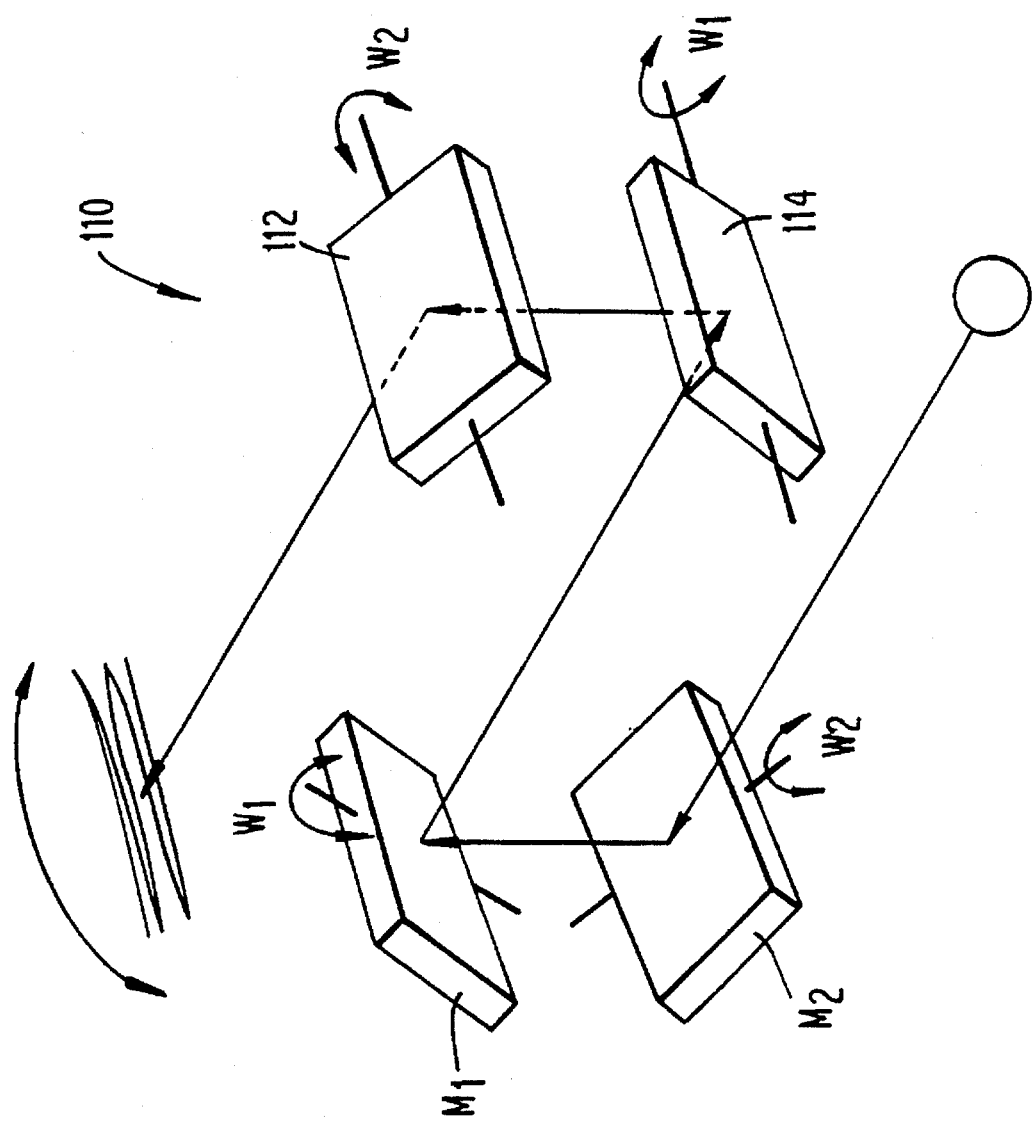
FIG. 16 is a perspective view of a rotating Lissajous scanner embodiment, implemented by four reflectors.

The above equations describe a rotating Lissajous pattern, and in fact, any Lissajous pattern may be rotated if the two sine functions are replaced by their Lissajous equivalent. If the resonant scan element has the desired equal amplitude and phase responsive at the two sinusoidal components of each drive axis, as illustrated in FIG. 16 depicting the frequency response shapes of resonant scan elements for 2-D scanning, then no added compensation for phase and amplitude is required.

Figure 14:
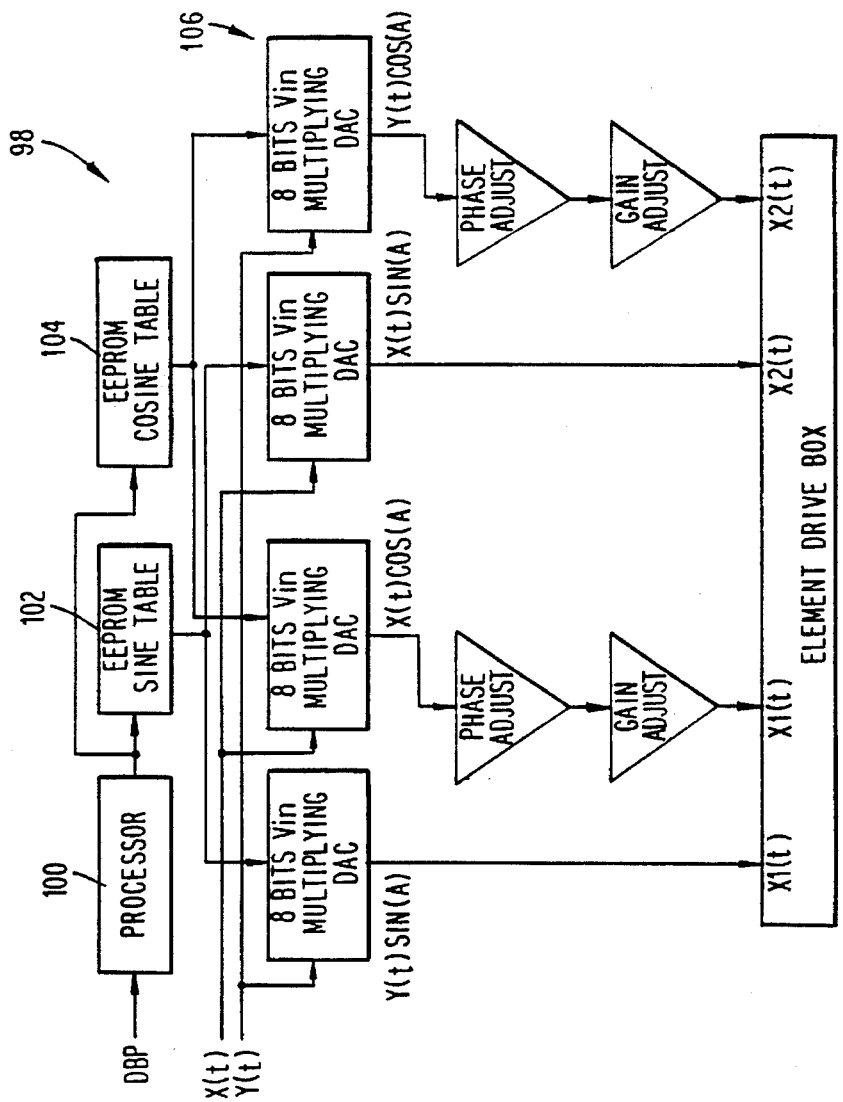
FIG. 14 is a block diagram of circuitry for generating signals for producing a rotating Lissajous scan pattern.

A circuit 98 for developing drive signals for Lissajous pattern rotation, shown in FIG. 14 and described by equations (3) and (4), comprises a processor 100 addressing sine and cosine EEPROM tables 102 and 104 that produce the sine and cosine values of the angle, in digital form, generated by the processor. These sine and cosine digital values are supplied to multiplying DAC units 106 to produce the analog sine and cosine functions of the above equations.

Figure 17A:
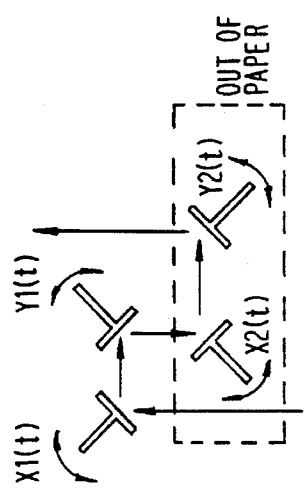
FIGS. 17A and 17B show two different reflector configurations for producing a rotating Lissajous scan pattern.
Figure 17B:
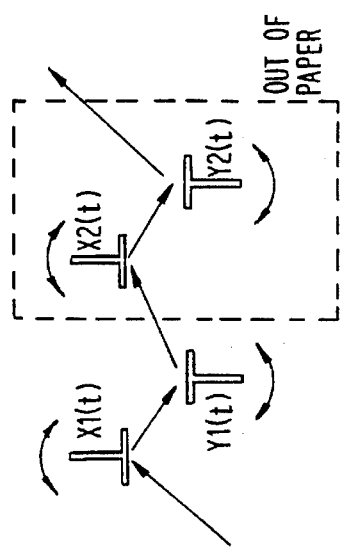

The four drive signals produced by circuit 98 of FIG. 14 may be applied to four resonant elements supporting four reflectors, each oscillating at a single resonant frequency, as shown in FIG. 17 and identified by numeral 110.

Figure 15:
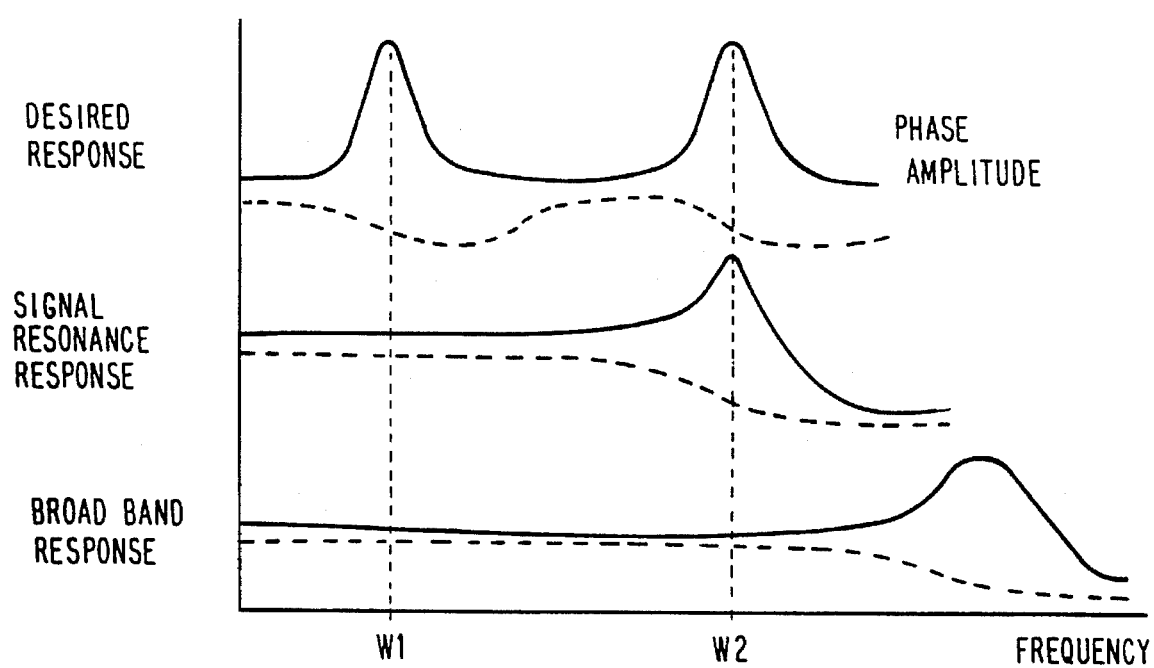
FIG. 15 depicts the amplitude and phase responses of resonant elements used for producing a rotating Lissajous scan pattern, in accordance with the invention.

A first pair 112, 114 of the mirrors 110 is optically combined as X-axis elements having two resonant frequencies. The second pair is arranged as a Y-axis element having two resonant frequencies that match those of the first pair. The mirrors may be oriented in either of the configurations of FIGS. 15A and 15B.

Alternatively, each mirror pair may be combined on a single resonant element wherein a distinct resonant peak is available for each axis. The element hence can be driven at its resonance frequency by the higher frequency w2 and off resonance by the lower frequency w1, but with a larger amplitude and any necessary phase compensation. Resonance elements of dual resonant frequency response may be arranged orthogonally to produce the rotatable raster patterns in this case.

Figure 9A:
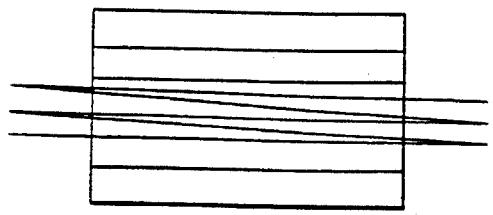
FIG. 9A depicts a raster pattern scanning a 2-D barcode.
Figure 9D:
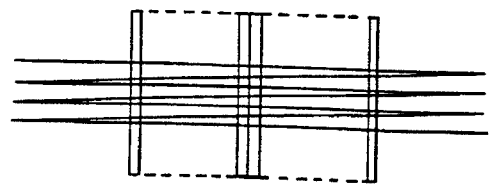
FIGS. 9D–9F present the same scan patterns to a 1-D barcode.
Figure 9B:
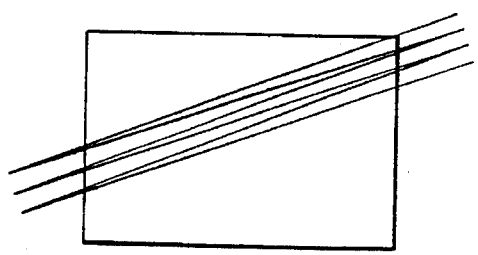
in FIG. 9B, the scan pattern is horizontally misoriented with respect to the barcode; and in FIG. 9C, the scan pattern contains a degree of droop.
Figure 9E:
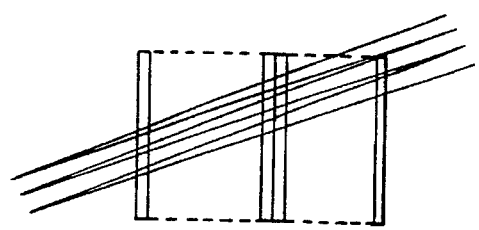
Figure 9C:
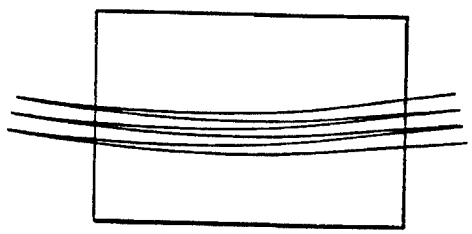
Figure 9F:
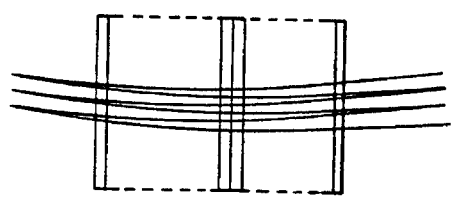

FIGS. 9A–9D are raster patterns scanning 2-D and 1-D barcodes, respectively, in perfect alignment. However, in practice since the orientation of the scan pattern will not be in perfect alignment with the barcode; scanning typically will be somewhat skewed as shown in FIGS. 9B and 9E. Furthermore, since 2-D scanning mechanisms tend to be slightly non-linear and will ordinarily produce a somewhat arcuate, or drooped, scan pattern as shown in FIGS. 9C and 9F, decoding of the barcode is somewhat difficult to achieve when a complete row of barcode is not entirely scanned.

Figure 7:
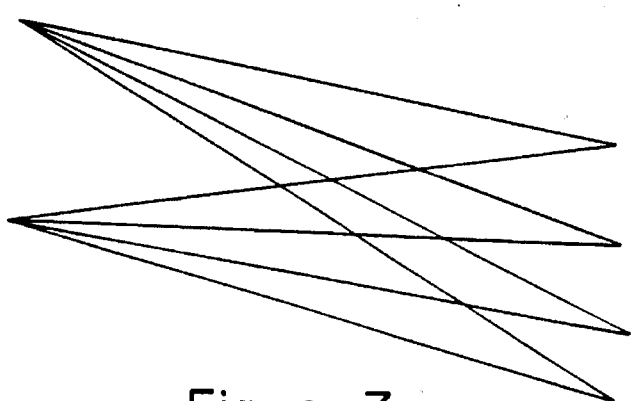
FIG. 7 shows a precessing raster scan pattern for decoding 2-D barcodes of various orientations.

To compensate for rotational misalignment between the scan pattern and barcode, or droop in the scan pattern, another aspect of the invention precesses the raster so as to traverse barcode elements that are angularly displaced or are not oriented along a straight line. Referring to FIG. 7, the angle of sweep of each line by the raster scanner is staggered or precessed slightly, so that the light beam sweeps across the barcodes in a zig-zag pattern. Precession whereby subsequent scanning patterns are rotationally offset from a previous pattern, occurs when the ratio of the X component to the Y component of the scanning pattern is not an integer. In the preferred embodiment, the scan ratio is 1.75:1. For example, if the X component frequency is 120 scans per second, then the Y component frequency is 68.5 scans per second (120 divided by 1.75). The scanner can be designed such that the scan ratio is always 1.75:1, although precession alternatively can be achieved by activating the Y frequency scan by a computer driver. Preferably, each row of the bar code will be traversed by two lines of scan, although only a single scan line per row is necessary.

The resultant zig-zag pattern causes the light beam to sweep the barcode symbols in a plurality of different angles, so that angularly offset lines of barcode up to about thirty degrees of offset can be read by the raster during precession. Similarly, even if the beam emitted by the scanner contains a degree of droop, the precessing raster will scan every barcode line during successive frames.

Figure 18:
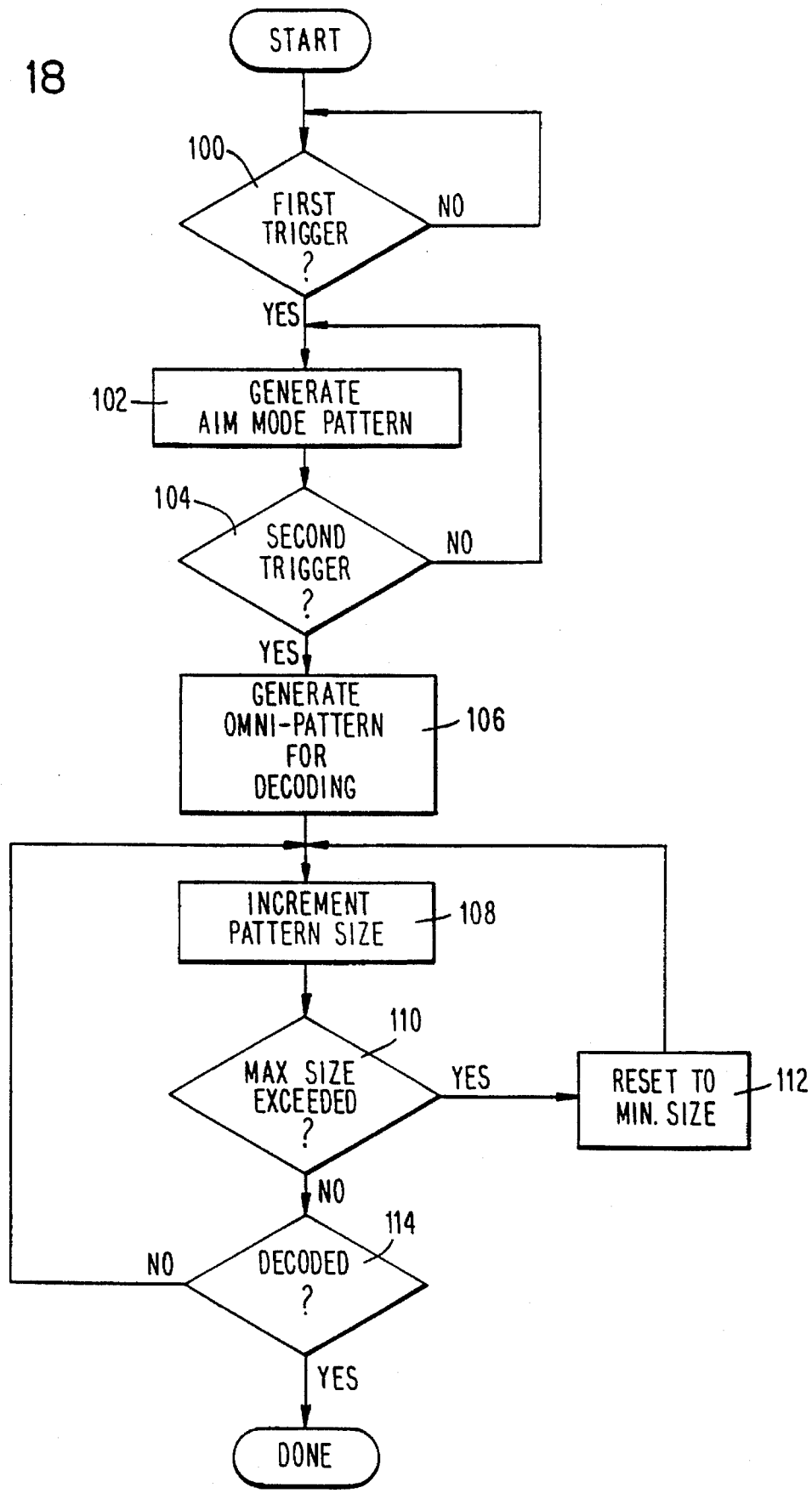
FIG. 18 is a flow chart of trigger initiated, omni-directional scan pattern generation.
Figure 19:
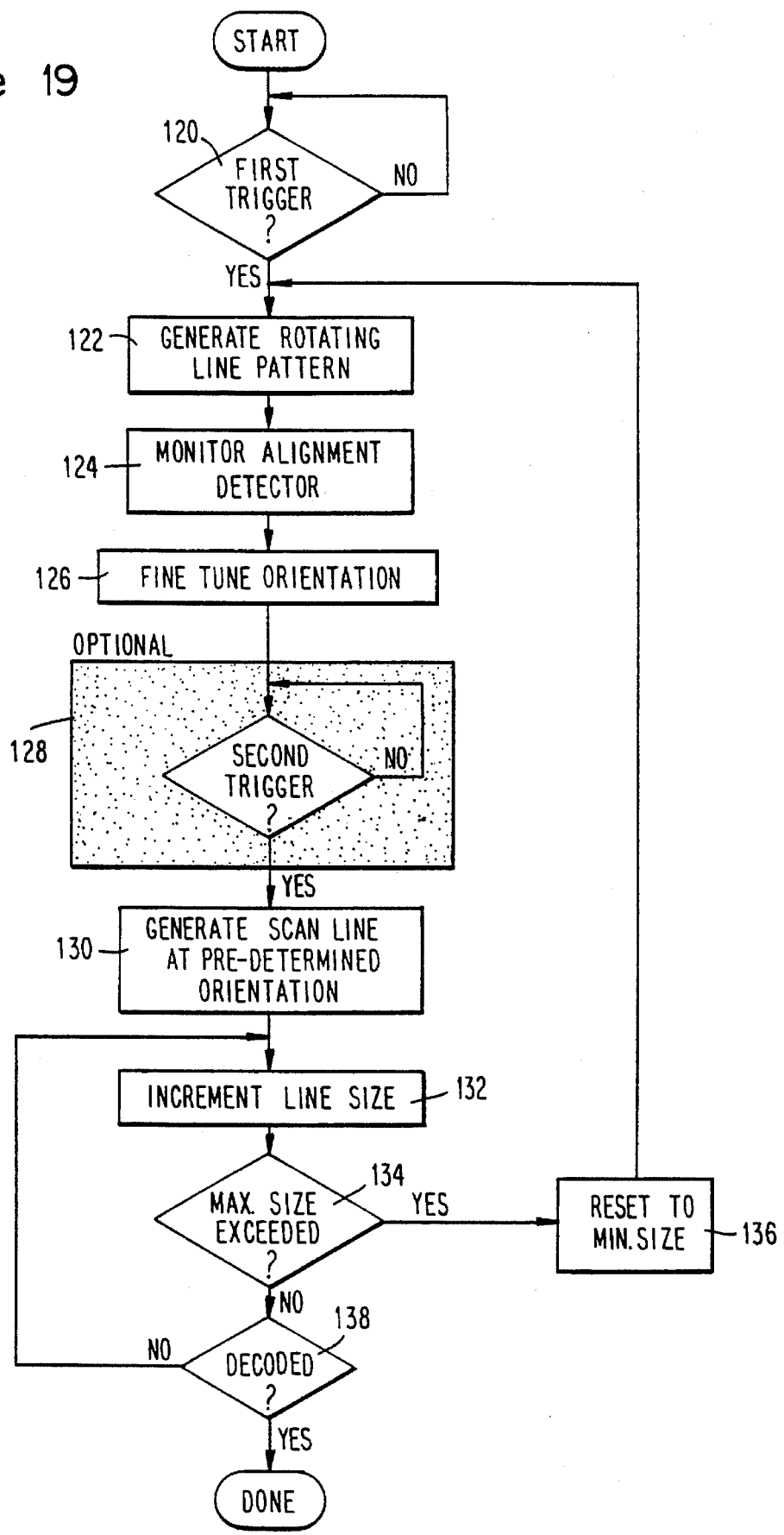
FIG. 19 is a flow chart of automatic "aim and shoot" pattern generation, in accordance with the invention.

The processors 82 of FIG. 13A and 100 of FIG. 14 are programmed to control the scanner of this invention in the aim and decode modes, either by manual (trigger) operation or automatically as described previously. Programming of the processors will now be described with reference to the flow charts of FIGS. 18 and 19. FIG. 18 represents scanner operation for either 1-D or 2-D barcodes, wherein the trigger must be operated once for aim and a second time for decode. In FIG. 19, describing a 1-D barcode scanning example, the transition between aim and decode modes of operation is automatic. In some cases, the requirement to operate the trigger twice for aim and decode is preferable, to prevent a symbol from being decoded prematurely or decoding a neighboring barcode.

Referring to FIG. 18, the scanner awaits a first operation of the manual trigger, and when the trigger has been first depressed, as detected in step 100, the scanner generates the aim mode pattern which, as aforementioned, preferably is an omnidirectional pattern (an omnidirectional pattern is one wherein the scan angle the beam traverses over time is not limited) and may be any suitable scan pattern that is radially symmetric, e.g., not a simple raster pattern, including those shown in FIGS. 5A–E or FIG. 6; the oscillating circle or spiral pattern (FIG. 5C) being best from a standpoint of visibility and the rotating Lissajous pattern being best from the standpoint of preliminary decoding of the barcode (step 102).

The scanner now waits for another trigger operation, and when the trigger has been manually operated for the second time, as determined in step 104, an omni-pattern for decoding is generated by the scanner (step 106). In the example of FIGS. 4A and 4B, as described previously, the aim pattern in the form of a rotating Lissajous for aiming transitions converts to a raster for decoding, and as shown in FIG. 4C the aiming pattern is incremented in size (step 108) until the maximum size of the pattern is exceeded (step 110) when the scan pattern is reset in step 112 to increment again.

If, however, the barcode has been fully decoded, determined in step 114, before the maximum size of the scan pattern is exceeded, the routine is completed.

The size of each pattern increment, and the rate at which the increments are generated, are preferably controlled in response to data read from the symbol during the aim mode to achieve an optimal rate of Y-direction expansion depending on the number of rows in and height of a label. If the 2-D code is not successfully decoded at step 114, then decoding is continued until either a successful decode has occurred or until a predetermined amount of time, typically on the order of three seconds, has elapsed.

In accordance with FIG. 19, transition from the aim mode to the decode mode is made automatically, and for this example, the procedure is particularized for scanning a 1-D barcode, although the procedure could be generalized to encompass 2-D barcodes as well.

In response to manual operation of the trigger, in step 120, a rotating line pattern (step 122), corresponding to what is shown in FIG. 5E, is produced. Alignment of the rotating line pattern and barcode is monitored in step 124, and may optionally be fine tuned in accordance with step 126. Alignment may be performed in accordance with the procedure of FIG. 11 and circuit of FIG. 12.

A second manual operation of the trigger per step 128 is optional. Even if the trigger is not operated at this time, when the decoder has determined the optimum angle at which to emit a decode scan pattern, the pattern is produced (step 130). The line size is incremented (step 132) until it exceeds the length of the barcode (step 134). If the maximum size is exceeded, the size of the scan line is reduced to the minimum size for aiming (step 136) and the process repeats. During the time the length of the scan line is incremented, the barcode is being decoded, in step 138, and when decoding is completed, the routine is terminated.

In either the manual or automatic operations, the light beam directed toward the symbol to be read is transitioned between first and second scan paths in the aim and decode modes. In addition to transition between the scan paths described above, the first and second scan paths may differ from each other by rotation about an axis of rotation, by increase in scan path envelope diameter, by both rotation and envelope diameter increase and by displacement of the center of rotation of the first scan pattern.

The user can, therefore, simply aim an apparent spot on the barcode, without regard for the barcode's orientation, and then decode it upon the second trigger pull. It is also possible to provide automatic scan line opening without a second trigger pull. However, there is a danger that the scanner may unintentionally scan and decode the wrong barcode.

Hence, as described herein, the invention produces a rotating Lissajous scan pattern or other pattern that is easily seen by the user during aiming on a barcode, and then under manual control or automatically converts to a decode scan that is robust and opens at a rate, and to a size, that depends upon the barcode itself. If the barcode is a 1-D code, the decode pattern may be a precessing raster that is able to scan rows that are rotationally misaligned with the scan lines. Scanning is implemented by novel miniature 1-D and 2-D scanning assemblies, as described herein.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A scanning system including a scanning head operable both in portable and fixed modes for reading indicia such as barcode symbols by scanning such indicia according to a predetermined scan pattern, comprising:

means for determining whether operation of the scanning head is in a fixed or portable mode;

means for determining the information content of indicia being read during a first period using a first scan pattern;

means for adapting the first scan pattern to an optimized second pattern based upon said information content for such mode of operation.

2. The system of claim 1, including means for detecting the mode in which said system is operating, and wherein said adapting means is responsive to said detecting means for controlling a light beam to traverse the indicia with a scan pattern optimized for the mode of operation.

3. The system of claim 2, wherein said adapting means controls the light beam to traverse the indicia with a scan pattern also optimized for reading the indicia.

4. The system of claim 3, wherein the adapting means controls said light beam so as to produce a self-aligning raster pattern when the system is operating in the fixed mode and the indicia comprise a 2-D barcode.

5. The system of claim 3, wherein the adapting means controls said light beam so as to produce a Lissajous raster pattern when the system is operating in the fixed mode and the indicia comprise a 1-D barcode.

6. The system of claim 3, wherein the adapting means controls said light beam so as to produce a single line pattern when the system is operating in the portable mode and the indicia comprise a 1-D barcode.

7. The system of claim 3, wherein the adapting means controls said light beam so as to produce an omnidirectional pattern when the system is operating in the portable mode and the indicia comprise a 1-D barcode.

8. The system of claim 3, wherein the adapting means controls said light beam so as to produce a stationary raster pattern when the system is operating in the portable mode and the indicia comprise a 2-D barcode.

9. The system of claim 3, wherein the scan pattern is further optimized selectively for presentation and pass through modes of operation.

10. A system for reading coded indicia of different classifications, comprising:

an electro-optical reader within a portable housing having a means for enabling a human operator to hold and aim the reader at indicia to be read, the reader including a light source for generating a light beam, a light detector for receiving light reflected from said indicia and in response generating an electrical signal, and means for converting said electrical signal to data representing the information content of said indicia;

a stationary fixture having a means for supporting the portable housing of the reader when not held by the operator to enable the light beam to be conveniently positioned with respect to indicia to be read by the reader; and scan control means for controlling the light beam to enable the beam to scan the indicia with a first scan pattern for reading the indicia independently of indicia orientation when the portable housing is mounted in said fixture and with a second scan pattern optimized for reading a prescribed classification of indicia when the portable housing is separated from said fixture.

11. The system of claim 10, wherein said first scan pattern comprises an omnidirectional scan pattern.

12. The system of claim 10, wherein said first scan pattern comprises a Lissajous pattern.

13. The system of claim 12, wherein said Lissajous pattern is rotating.

14. The system of claim 10, wherein said first scan pattern comprises a rotating scan pattern.

15. The system of claim 10, wherein said first scan pattern comprises a precessing scan pattern.

16. The system of claim 10, wherein said second scan pattern is a precessing raster pattern.

17. The system of claim 10, wherein said second scan pattern comprises a line pattern.

18. The system of claim 10, wherein said second scan pattern comprises a star pattern.

19. The system of claim 10, including means for detecting whether said housing is mounted in said fixture, and wherein said scan control means is responsive to said detecting means for controlling the light beam to traverse the indicia with a particular scan pattern.

20. The system of claim 19, wherein said scan control means is further responsive to information content of said indicia for controlling the light beam to traverse the indicia with a particular scan pattern.

21. A system for reading coded indicia, comprising:

an electro-optical reader within a portable housing having a means for enabling a human operator to hold and aim the reader at indicia to be read, the reader including a light source for generating a light beam, a light detector for receiving light reflected from said indicia and responsively generating an electrical signal, and means for converting said electrical signal to data representing information content of said indicia;

a stationary fixture having a means for supporting the portable housing of the reader when not held by the operator; and scan control means for controlling the light beam to scan the indicia with different prescribed scan patterns in response to the information content of the indicia and whether the portable housing is separated from or mounted in said fixture.

22. The system of claim 21, wherein, when said housing is separated from said fixture, said scan means controls the light beam to scan the indicia with a scan pattern that indexes angularly so as to traverse said indicia along different directions progressively as a function of time.

23. The system of claim 22, wherein, when said indicia content corresponds to a 1-D barcode pattern, said scan pattern is a rotating Lissajous pattern.

24. The system of claim 22, wherein, when said indicia content corresponds to a 2-D barcode pattern, said scan pattern is a precessing raster pattern.

25. The system of claim 21, wherein, when said housing is mounted in said fixture, said scan means controls the light beam to scan the indicia with a linear scan pattern.

26. The system of claim 25, wherein, when said indicia content corresponds to a 1-D barcode pattern, said scan pattern is a single line scan pattern.

27. The system of claim 25, wherein, when said indicia content corresponds to a 2-D barcode pattern, said scan pattern is a raster pattern.

28. A device for reading barcode symbols comprising:

a light source for generating a light beam and directing the beam toward a symbol to be read;

a light detector for receiving light reflected from said symbol and, in response, generating an electrical signal;

means for converting said electrical signal to data representing the information content of said barcode symbol; and scan control means for controlling the light beam to scan the symbol with a prescribed scan pattern to develop control information, and thereafter to increase a dimension of the scan pattern at a rate dependent upon said control information, wherein said scan control means includes means for executing (a) an aim mode of operation wherein said light beam is controlled to scan said symbol with a first prescribed scan pattern that is visible to the user and covers only a portion of said symbol, and (b) a decode mode of operation wherein said light beam is controlled to scan a portion of said symbol with a second prescribed scan pattern and thereafter to successively increment the size of said second prescribed scan pattern while decoding said symbol, and wherein said scan control means further includes means responsive to data produced during said aim mode of operation for determining whether the symbol is a one-dimensional or a two-dimensional barcode, and wherein said second prescribed scan pattern is controlled to be a stationary or precessing raster scan pattern if said symbol is determined to be a two-dimensional barcode.

29. The device of claim 28, wherein said first prescribed scan pattern is other than a raster, and said scan control means includes circuit means for transitioning from said first prescribed scan pattern to said second prescribed scan pattern, and said second prescribed scan pattern is a stationary or precessing raster.

30. A device for reading barcode symbols, comprising:

a light source for generating a light beam and directing the beam toward a symbol to be read;

a light detector for receiving a light reflected from said symbol and, in response, generating an electrical signal;

means for converting said electrical signal to data representing the information content of said barcode symbol; and scan control means for controlling the light beam to scan the symbol with a prescribed scan pattern to develop control information, and thereafter to increase a dimension of the scan pattern at a rate dependent upon said control information, wherein said scan control means includes means for executing (a) an aim mode of operation wherein said light beam is controlled to scan said symbol with a first prescribed scan pattern that is visible to the user and covers only a portion of said symbol, and (b) a decode mode of operation wherein said light beam is controlled to scan a portion of said symbol with a second prescribed scan pattern and thereafter to successively increment the size of said second prescribed scan pattern while decoding said symbol, and wherein when said symbol is determined to be a one-dimensional barcode, said first and second prescribed patterns are controlled to be a rotating Lissajous.

31. A device for reading barcode symbols, comprising:

a light source for generating a light beam and directing the beam toward a symbol to be read;

a light detector for receiving light reflected from said symbol and, in response, generating an electrical signal;

means for converting said electrical signal to data representing the information content of said barcode symbol; and scan control means for controlling the light beam to scan the symbol with a prescribed scan pattern to develop control information, and thereafter to increase a dimension of the scan pattern at a rate dependent upon said control information, wherein said scan control means includes means for executing (a) an aim mode of operation wherein said light beam is controlled to scan said symbol with a first prescribed scan pattern that is visible to the user and covers only a portion of said symbol, and (b) a decode mode of operation wherein said light beam is controlled to scan a portion of said symbol with a second prescribed scan pattern and thereafter to successively increment the size of said second prescribed scan pattern while decoding said symbol, and wherein when said symbol is determined to be a two-dimensional barcode, said first and second prescribed patterns are controlled to be rotating Lissajous and raster scan patterns, respectively.

32. A method for reading barcode symbols, comprising the steps of:

directing a light beam toward a symbol to be read;

controlling said light beam to scan said symbol with a prescribed scan pattern of a first prescribed dimension;

receiving light reflecting from said symbol, and in response, generating an electrical signal;

producing first data corresponding to said electrical signal;

increasing the dimension of said prescribed scan pattern at a rate dependent upon said first data;

executing (a) an aim mode of operation by controlling said light beam to scan said symbol with a first prescribed scan pattern that is visible to the user and covers only a portion of said symbol, and (b) a decode mode of operation by controlling said light beam to scan a portion of said symbol with a second prescribed scan pattern and thereafter to successively increment the size of said second prescribed scan pattern while decoding said symbol; and responding to data produced during said aim mode of operation by determining whether the symbol is a one-dimensional or two-dimensional barcode symbol, and controlling said second prescribed scan pattern to be a stationary or precessing raster if said symbol is determined to be a two-dimensional barcode.

33. The method of claim 32, wherein when said first prescribed scan pattern is other than a stationary raster or precessing scan pattern, and including the additional step of transitioning said scan pattern from said first prescribed scan pattern to a stationary or precessing raster scan pattern.

34. A method of reading barcode symbols, comprising the steps of:

directing a light beam toward a symbol to be read;

executing an aim mode of operation by controlling said light beam to scan said symbol with a visible scan pattern that is relatively small compared to the symbol;

receiving light reflected from said symbol, and producing first data identifying an attribute of said symbol; and executing a decode mode of operation by producing second data corresponding to the symbol while increasing a dimension of said scan pattern at a rate and to a size dependent upon said first data, wherein said scan patterns in said aim and dcode modes of operation are of different configurations.

35. The method of reading barcode symbols, comprising the steps of:

directing a light beam toward a symbol to be read;

executing an aim mode of operation by controlling said light beam to scan said symbol with a visible scan pattern that is relatively small compared to the symbol;

receiving light reflected from said symbol, and producing first data identifying an attribute of said symbol;

executing a decode mode of operation by producing second data corresponding to the symbol while increasing a dimension of said scan pattern at a rate and to a size dependent upon said first data; and responding to data produced during said aim mode of operation by determining whether the symbol is a one-dimensional or two-dimensional barcode, and controlling said scan pattern to be a stationary or precessing raster scan pattern during said decode mode of operation if said symbol is determined to be a two-dimensional barcode symbol.

36. A device for reading barcode symbols comprising:

a light source for generating a light beam and directing the beam toward a symbol to be read;

scan control means for controlling the light beam to scan the symbol with a rotating Lissajous scan pattern;

a light detector for receiving light reflected from said symbol and, in response, generating an electrical signal; and means for converting said electrical signal into first data corresponding to an attribute of said barcode symbol;

said scan control means including further means for converting the rotating Lissajous scan pattern to a raster scan pattern depending upon said barcode symbol attribute.

37. The device of claim 36, wherein said symbol attribute defines whether the symbol is a one-dimensional or two-dimensional barcode, and said scan control means converts said rotating Lissajous scan pattern to a raster scan pattern only if said symbol is a two-dimensional scan pattern.

38. The device of claim 37, wherein the attribute defines symbol size or type, and said scan control means further increases the size of said raster scan pattern to a maximum size determined by the attribute.

39. The device of claim 37, wherein said scan control means includes means for determining rotational orientation of said symbol, and responsively controlling rotational alignment of said raster scan pattern.

40. The device of claim 39, incorporated in a housing including an approximately square window for enabling said light beam to pass therethrough.

41. The device of claim 40, wherein said housing is adapted to be hand-held, and means for releasably attaching said housing to a surface mount base.

42. The device of claim 41, wherein said surface mount base enables said housing to rotate about at lease one of a vertical axis and horizontal axis.

43. The device of claim 41, wherein said surface mount base includes a vertical extension to increase height of said housing.

44. A method of reading barcode symbols, comprising the steps of:

directing a light beam toward a symbol to be read;

executing an aim mode of operation by controlling said light beam to scan said symbol with a visible scan pattern in the form of a rotating Lissajous pattern;

receiving light reflected from said symbol, and producing first data identifying an attribute of said symbol including whether said symbol represents a one-dimensional barcode symbol or a two-dimensional barcode symbol; and executing a decode mode of operation such that (a) if during said aim mode of operation, said symbol is determined to be a one-dimensional barcode, decoding while scanning using a rotating Lissajous scan pattern to scan said symbol, and (b) if during said aim mode of operation said symbol is determined to be a two-dimensional barcode, decoding while using a raster scan pattern to scan said symbol.

45. The method of claim 44, wherein, during (b) the raster scan pattern is increased in size during decoding.

46. The method of claim 45, wherein said raster scan pattern is increased in size at a rate that depends on symbol attribute.

47. The method of claim 44, wherein, during (b), the raster scan pattern precesses.

48. The method of claim 44, further including determining rotational orientation of said symbol during the aim mode of operation, and responsively controlling rotational alignment of said raster scan during the decode mode of operation.

49. A bar code reader, comprising:

a light beam scanner generating a light beam directed toward a symbol to be read and moving said light beam along said symbol in an omnidirectional scanning pattern;

a light-detector receiving reflected light from said symbol and generating electrical signals responsive to said reflected light; and means for controlling said scanning pattern in response to said electrical signals, wherein said light beam scanner moves said light beam selectively on a first scan path or on a second scan path different from the first scan path depending on an analysis of said electrical signals.

50. The bar code reader of claim 49, wherein said scanning pattern is radially symmetric.

51. The bar code reader of claim 49, wherein said scanning pattern is a rotating line pattern.

52. The bar code reader of claim 49, wherein said scanning pattern is a spiral pattern.

53. The bar code reader of claim 49, wherein said means for controlling varies the trajectory of said light beam in response to said electrical signals.

54. The bar code reader of claim 49, wherein said means for controlling varies the diameter of said scan pattern in response to said electrical signals.

55. The bar code reader of claim 49, wherein said first and second scan paths differ from each other by rotation about an axis of rotation.

56. The bar code reader of claim 49, wherein said second scan path differs from said first scan path by an increase in scan path envelope diameter.

57. The bar code reader of claim 49, wherein said second scan path differs from said first scan path by rotation of the first scan path about an axis of rotation and increase of scan path envelope diameter.

58. The bar code reader of claim 49, wherein said second scan path differs from said first scan path by displacement of a center of rotation of said first scan pattern.

59. A system for reading optically encoded symbols, comprising:

scanning means for generating a laser beam directed toward a target and producing a first scanning pattern that enables a user to manually aim and direct the beam to the location desired by the user and a relatively larger second scanning pattern in the form of a Lissajous pattern that sweeps an entire symbol to be read, means for changing the scanning pattern produced by said scanning means from said first scanning pattern to said second scanning pattern; and detection means for receiving reflected light from a symbol being read to produce an electrical signal corresponding to data represented by said symbol.

60. The system of claim 59, wherein said scanning means includes a semiconductor laser light source to produce said laser beam, and further comprising a housing for manual support having an exit port, wherein said scanning means and said detection means are located in said housing, and said housing includes a handle of a configuration enabling the user to manually aim and direct the laser beam to the target.

61. The system of claim 60, further comprising manually actuatable trigger means on said housing for initiating said first scanning pattern, and indicator means to inform the user that the housing is positioned in the correct working range for reading bar code symbols.

62. The system of claim 61, wherein said trigger means includes a multi-purpose trigger operatively connected to said scanning means to select between the first scanning pattern and the relatively larger second scanning pattern.

63. A method for reading optically encoded symbols, comprising the steps of:

generating a laser beams directed toward a target and producing a first scanning pattern that enables the user to manually aim and direct the beam to the location desired by the user and a relatively larger second scanning pattern in the form of an omnidirectional pattern that sweeps an entire symbol to be read;

changing from said first scanning pattern to said second scanning pattern; and receiving reflected light from said symbol to produce an electrical signal corresponding to data represented by said symbol.

64. A method for reading bar code symbols, comprising the steps of:

generating a laser beam directed toward a target and producing a first scanning pattern that has a reflectivity on the target that enables a user to manually aim and direct the beam to a desired location on the target;

generating a sequence of different subsequent scanning patterns that each are rotationally offset with respect to the preceding scanning pattern, including a scanning pattern that sweeps the entire symbol to be read; and receiving reflected light from the symbol to produce an electrical signal corresponding to data represented by said symbol;

wherein said target includes a bar code symbol with at least two rows of bar patterns and one of said subsequent scanning patterns covers the entire symbol with at least two scan lines per row of bar patterns during reading.

65. A bar code reader, comprising:

a light beam scanner generating a light beam directed toward a symbol to be read and moving said light beam along said symbol in a predetermined scanning pattern having a center of rotation;

a light detector receiving reflected light from said symbol and generating electrical signals responsive to said reflected light; and means for controlling the angular orientation of said scanning pattern with respect to a center of rotation thereof in response to said electrical signals so as to change the scan path of said light beam from a first scan path to a second and subsequent scan paths in response to said electrical signals so as to create a rotating scan pattern.

66. The bar code reader of claim 65, wherein the change from said first scan to said second scan path is rotation of the light beam scanning pattern about an axis of rotation.

67. The bar code reader of claim 65, wherein the change from said first scan path to said second scan path further comprises an increase in the diameter of the envelope of the scan pattern.

68. The bar code reader of claim 65, wherein the change from said first scan path to said second scan path is rotation about an axis of rotation and an increase in envelope diameter of the scan pattern.

69. The bar code reader of claim 65, wherein the change from said first scan path to said second scan path is displacement of the center of rotation of the scan pattern.

70. The bar code reader of claim 65, wherein the change from first scan path to said second scan path comprises change to a Lissajous pattern.

71. An optical scanning system for reading optically encoded indicia on a target, said system having a reading head which emits a light beam, wherein said indicia is within one of a plurality of symbology classifications, comprising:

means for determining if said reading head is in a portable or fixed mode of operation;

means for scanning said indicia with the light beam in a first scan pattern on said target and detecting light reflected therefrom; and means for determining the symbology classification of said indicia from said detected light, wherein said means for scanning functions to scan said indicia with the light beam along a second scan pattern on the target and detect light reflected therefrom, said second scan pattern being selected based upon the determined mode of operation and the determined symbology classification.

72. A system according to claim 71, wherein said first scan pattern is a rotating Lissajous scanning pattern.

73. A system according to claim 71, wherein:

the reading head is in said fixed mode of operation; and based upon the determined symbology classification, said second scan pattern is either a self-aligning raster pattern or a rotating Lissajous pattern.

74. A system according to claim 71, wherein:

the reading head is in said portable mode of operation; and based upon the determined symbology classification, said second scan pattern is either a stationary raster pattern or a single or rotating line pattern.

75. A system according to claim 71, wherein said reading head is in said fixed mode of operation, the symbology classification is a one dimensional barcode symbology and the second scan pattern is identical to said first scan pattern.

76. A system according to claim 71, wherein said plurality of symbology classifications include a one dimensional barcode symbology and a two-dimensional barcode symbology.

77. A system according to claim 71, wherein said means for determining the symbology classification samples a sequence of bars and spaces within said indicia and determines the symbology classification of the indicia based on said sampled sequence.

78. A system according to claim 71, further comprising means for determining if said target is presented to said reading head in a presentation mode or a pass-through mode;

wherein said second scan pattern is further based upon said determined mode in which said target is presented.

79. A system according to claim 71, wherein:

said first scan pattern has a scan envelope with a first cross-sectional dimension;

the second scan pattern has a scan envelope with a second cross-sectional dimension; and the second cross-sectional dimension is different than the first cross-sectional dimension.

80. A system according to claim 71, wherein:

said light beam is scanned along a first scan path or a second scan path to form the second scan pattern.

81. A system according to claim 71, wherein:

said light beam is sequentially scanned along a first scan path and a second scan path to form the second scan pattern.

82. A system according to claim 81, wherein said second scan path is angularly displaced from said first scan path.

83. A system according to claim 81, wherein:

said second scan pattern has an axis of symmetry; and the axis of symmetry with said light beam scanned along said first scan path is offset from the axis of symmetry with said light beam scanned along said second scan path.

84. A system according to claim 81, wherein the second scan pattern has a diameter and the diameter of the second scan pattern with said light beam scanned along said first scan path is different than the diameter of the second scan pattern with said light beam scanned along said second scan path.

85. A system according to claim 71, further comprising means for decoding a signal representing the detected light to obtain information encoded in the indicia.

86. A system according to claim 71, further comprising a gun-shaped housing in which said reading head is disposed.

87. An optical scanning system for reading optically encoded indicia on a target, said system having a reading head which emits a light beam, wherein said indicia is within one of a plurality of symbology classifications, comprising:

means for scanning said indicia with the light beam in a first scan pattern on said target and detecting light reflected therefrom;

means for determining the symbology classification of said indicia from said detected light; and selectively changing an operational parameter of the means for scanning based upon the determined symbology classification.

88. A system according to claim 81, wherein said first scan pattern is a rotating Lissajous scanning pattern.

89. A system according to claim 87, wherein:

said means for scanning subsequently scans said indicia with the light beam in a second scan pattern on the target and detects reflected light therefrom; and said second scan pattern is based upon the determined symbology classification.

90. A system according to claim 89, wherein:

based upon a determination that said symbology classification is a first symbology classification, said second scan pattern is a stationary or raster self-aligning raster pattern; and based upon a determination that said symbology classification is a second symbology classification said second scan pattern is a rotating Lissajous, a single line or a rotating line pattern.

91. A system according to claim 89, wherein the symbology classification is a one dimensional barcode symbology and the second scan pattern is of a type which is identical to said first scan pattern.

92. A system according to claim 87, wherein said plurality of symbology classifications include a one dimensional barcode symbology and a two-dimensional barcode symbology.

93. A system according to claim 87, wherein said means for determining the symbology classification samples a sequence of bars and spaces within said indicia and determines the symbology classification of the indicia based on said sampled sequence.

94. A system according to claim 87, further comprising:

means for decoding a signal representing the detected light to obtain information encoded in the indicia; and a gun-shaped housing in which said reading head is disposed.

95. An optical scanning system for reading optically encoded indicia on a target, said system having a reading head which emits a light beam, wherein said indicia is within one of a plurality of symbology classifications, comprising:

means for determining if said reading head is in a portable or fixed mode of operation; and means for scanning said indicia with the light beam in a scan pattern on said target and detecting light reflected therefrom, wherein said scan pattern is based upon said determined mode of operation.

96. A system according to claim 95, wherein the reading head is in said fixed mode of operation and said scan pattern is a self-aligning raster or a rotating Lissajous pattern.

97. A system according to claim 95, wherein the reading head is in said portable mode of operation and said scan pattern is a stationary raster or a single line or rotating line pattern.

98. A system according to claim 95, further comprising means for determining if said target is presented to said reading head in a presentation mode or a pass-through mode, wherein:

said scan pattern is further based on said determined mode in which said target is presented.

99. A system according to claim 95, further comprising:

means for decoding a signal representing the detected light to obtain information encoded in the indicia; and a gun-shaped housing in which said reading head is disposed.

100. A method for operating an optical scanning system to read optically encoded indicia on a target, said system having a reading head which emits a light beam, wherein said indicia is within one of a plurality of symbology classifications, comprising the steps of:

determining if said reading head is in a portable or fixed mode of operation;

scanning said indicia with the light beam in a first scan pattern on the target and detecting light reflected therefrom; and determining the symbology classification of said indicia from said detected light; and scanning said indicia with the light beam in a second scan pattern on the target and detecting light reflected therefrom;

wherein said second scan pattern is based upon said determined symbology classification and said determined mode of operation.

101. A method according to claim 100, wherein:

said reading head is in said fixed mode of operation;

the symbology classification is a one dimensional barcode symbology; and the second scan pattern is of a type which is identical to said first scan pattern.

102. A method according to claim 100, wherein said step of determining said symbology classification includes sampling a sequence of bars and spaces within said indicia and determining the symbology classification of the indicia based on said sampled sequence.

103. A method according to claim 100, further comprising the steps of:

determining if said target is presented to said system in a presentation mode or a pass-through mode;

wherein said second scan pattern is further based upon said determined mode in which said target is presented.

104. A method for operating an optical scanning system to read optically encoded indicia on a target, said system having a reading head which emits a light beam, wherein said indicia is within one of a plurality of symbology classifications, comprising the steps of:

scanning said indicia with the light beam in a first scan pattern on the target and detecting light reflected therefrom;

processing the detected light to determine the symbology classification of said indicia; and selectively changing an operational parameter of the scanning system so that the scan pattern is matched to the symbology classification.

105. A method according to claim 104, further comprising scanning said indicia with the light beam in a second scan pattern on the target;

wherein said second scan pattern is the scan pattern matched to said symbology classification.

106. A method according to claim 105, wherein:

the symbology classification is a one dimensional barcode symbology; and the second scan pattern is of a type which is identical to said first scan pattern.

107. A method according to claim 104, wherein said step of processing the detected light includes sampling a sequence of bars and spaces within said indicia and determining the symbology classification of the indicia based on said sampled sequence.

108. A method for operating an optical scanning system to read optically encoded indicia on a target, said system having a reading head which emits a light beam, wherein said indicia is within one of a plurality of symbology classifications, comprising the steps of:

determining if said reading head is in a portable or fixed mode of operation; and scanning said indicia with the light beam in a scan pattern on the target and detecting light reflected therefrom; and wherein said scan pattern is based upon said determined mode of operation.

109. A method according to claim 108, further comprising the steps of:
  determining if said target is presented to said system in a presentation mode or a pass-through mode; and wherein said scan pattern is further based upon said determined mode in which said indicia is presented.

* * * * *